(12) United States Patent
O'Donnell et al.

(10) Patent No.: US 8,895,896 B2
(45) Date of Patent: Nov. 25, 2014

(54) MODIFIED SERIES ARC WELDING AND IMPROVED CONTROL OF ONE SIDED SERIES ARC WELDING

(75) Inventors: Timothy M O'Donnell, Chesterland, OH (US); Stephen R Cole, University Heights, OH (US); Alonzo P. O. Yost, North Canton, OH (US)

(73) Assignee: Lincoln Global, Inc., City of Industry, CA (US)

( * ) Notice: Subject to any disclaimer, the term of this patent is extended or adjusted under 35 U.S.C. 154(b) by 622 days.

(21) Appl. No.: 13/164,161

(22) Filed: Jun. 20, 2011

(65) Prior Publication Data

US 2011/0309062 A1 Dec. 22, 2011

Related U.S. Application Data

(63) Continuation-in-part of application No. 11/327,736, filed on Jan. 9, 2006, and a continuation-in-part of application No. 11/465,999, filed on Aug. 21, 2006, now Pat. No. 8,519,302, which is a continuation of application No. 10/754,836, filed on Jan. 12, 2004, now Pat. No. 7,105,773.

(51) Int. Cl.
| | |
|---|---|
| *B23K 9/10* | (2006.01) |
| *B23K 9/12* | (2006.01) |
| *B23K 9/173* | (2006.01) |
| *B23K 9/18* | (2006.01) |

(52) U.S. Cl.
CPC .............. *B23K 9/1068* (2013.01); *B23K 9/124* (2013.01); *B23K 9/1735* (2013.01); *B23K 9/188* (2013.01); *B23K 9/121* (2013.01)

USPC .................................. 219/137.71; 219/130.1

(58) Field of Classification Search
CPC .................. B23K 9/09–9/0956; B23K 9/1075
USPC .............. 219/130.01–130.51, 137.7–137.71
See application file for complete search history.

(56) References Cited

U.S. PATENT DOCUMENTS

| | | | | |
|---|---|---|---|---|
| 2,669,640 | A | * | 2/1954 | Outcalt et al. ............. 219/73.21 |
| 2,669,929 | A | | 2/1954 | Shull et al. |
| 2,938,107 | A | | 5/1960 | Pease |
| 3,223,818 | A | | 12/1965 | Chyle |
| 3,549,856 | A | * | 12/1970 | Saenger, Jr. ............... 219/137 R |

(Continued)

FOREIGN PATENT DOCUMENTS

| | | |
|---|---|---|
| DE | 4112760 A1 | 10/1992 |
| GB | 1502288 A | 3/1978 |

(Continued)

OTHER PUBLICATIONS

European Search Report, Munich, Oct. 30, 2007, Jeggy, Thierry.

(Continued)

*Primary Examiner* — Sang Y Paik
(74) *Attorney, Agent, or Firm* — Perkins Coie LLP

(57) ABSTRACT

An electric arc welding system for depositing weld metal along a groove between two edges of a metal workpiece where the system contains a first power supply and a second power supply, each providing a welding waveform to respective welding electrodes. The positive output terminals of both power supplies are coupled to the same contact tip and the negative output terminal of one of the power supplies is not coupled to the workpiece.

21 Claims, 21 Drawing Sheets

(56) References Cited

U.S. PATENT DOCUMENTS

| | | |
|---|---|---|
| 3,562,612 A | 2/1971 | Munson |
| 4,088,866 A * | 5/1978 | Lund et al. ................ 219/137 R |
| 4,246,463 A * | 1/1981 | Shutt et al. .................. 219/73.2 |
| 4,301,355 A | 11/1981 | Kimbrough et al. |
| 4,700,042 A | 10/1987 | Ferrero et al. |
| 4,798,929 A | 1/1989 | Itoh |
| 5,278,390 A | 1/1994 | Blankenship |
| 5,973,291 A | 10/1999 | Kramer et al. |
| 6,111,216 A | 8/2000 | Stava |
| 6,177,651 B1 | 1/2001 | Reynolds et al. |
| 6,207,929 B1 | 3/2001 | Stava et al. |
| 6,291,798 B1 | 9/2001 | Stava |
| 6,472,634 B1 * | 10/2002 | Houston et al. ............ 219/130.5 |
| 6,683,271 B2 | 1/2004 | Rogers |
| 6,872,914 B2 | 3/2005 | Hsu |
| 7,041,937 B2 | 5/2006 | Ihde et al. |
| 7,105,773 B2 | 9/2006 | Myers |
| 7,183,516 B2 | 2/2007 | Blankenship et al. |
| 8,278,587 B2 | 10/2012 | Zhang et al. |
| 2003/0071025 A1 | 4/2003 | Hsu |
| 2006/0037952 A1 | 2/2006 | Myers et al. |
| 2006/0163230 A1 | 7/2006 | Kaufman |

FOREIGN PATENT DOCUMENTS

| | | |
|---|---|---|
| JP | 51013347 | 2/1976 |
| JP | 56004381 | 1/1981 |
| SU | 1540996 A1 | 2/1990 |

OTHER PUBLICATIONS

International Search Report, Clifford C. Shaw, PCT/US05/39134.
Written Opinion of the International Searching Authority, Apr. 4, 2006.
International Preliminary Report on Patentability, May 6, 2008.

* cited by examiner

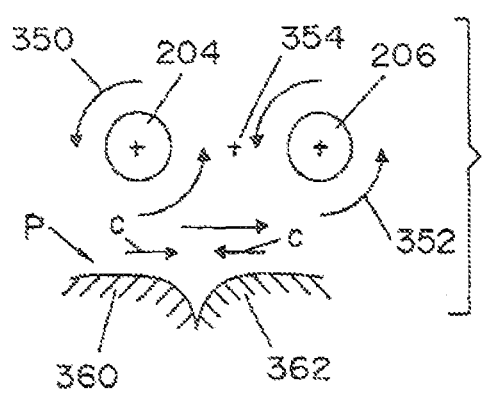
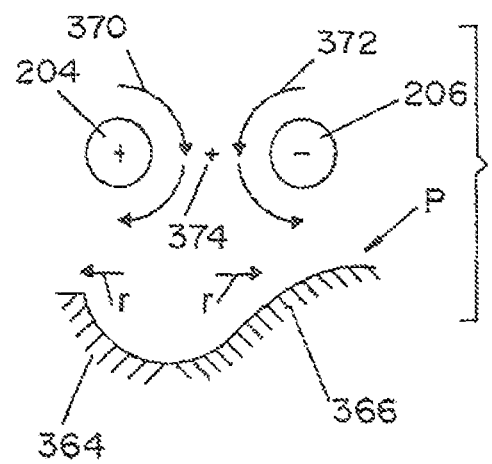
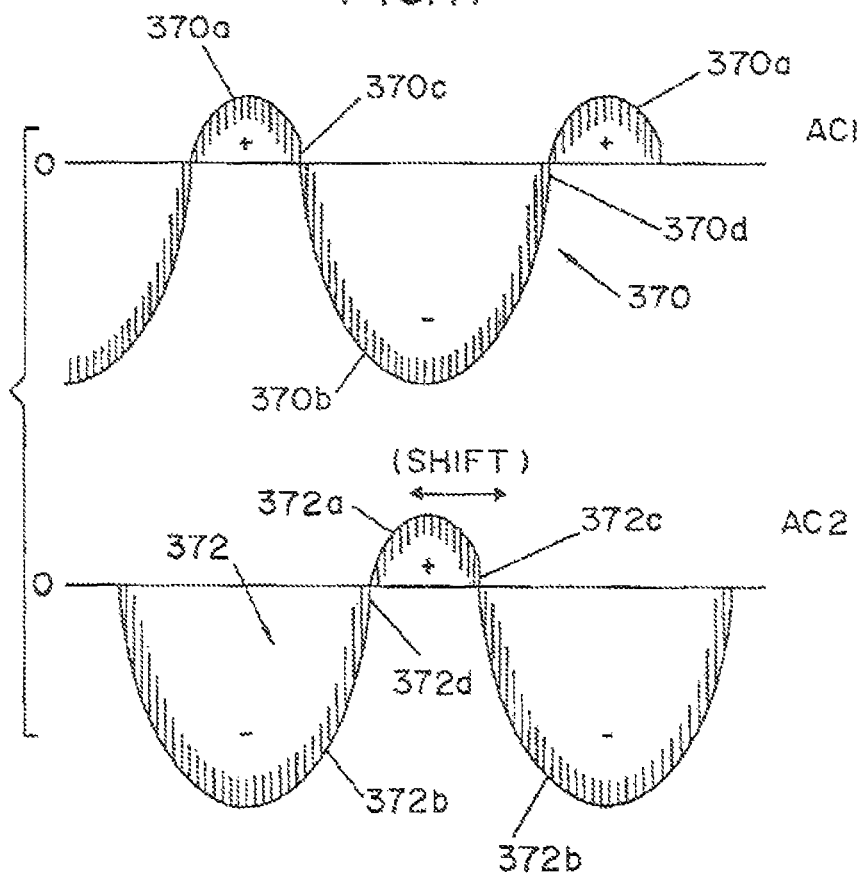

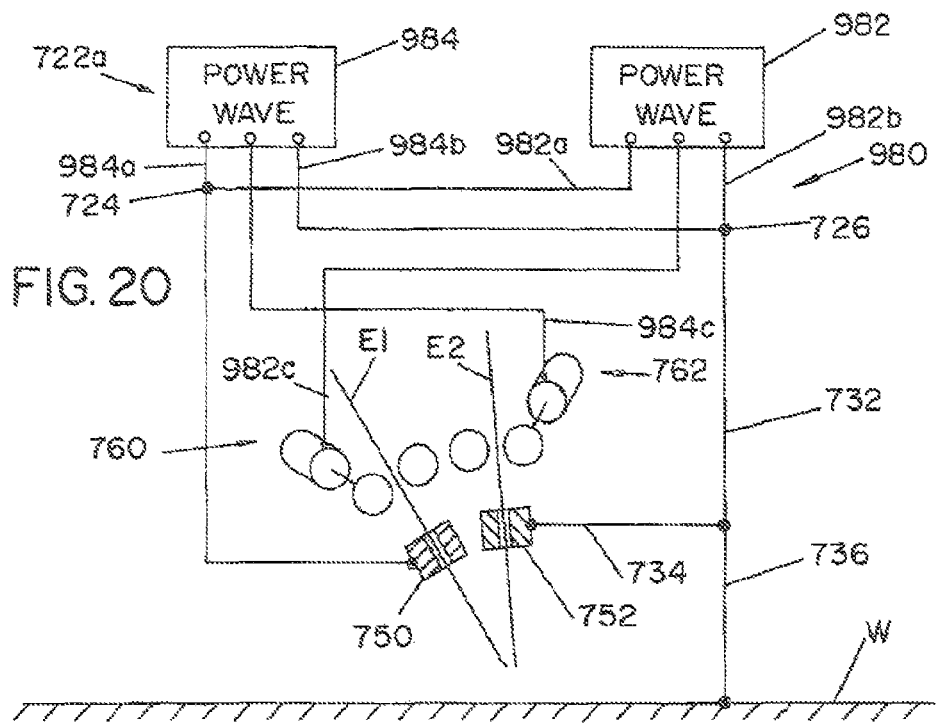
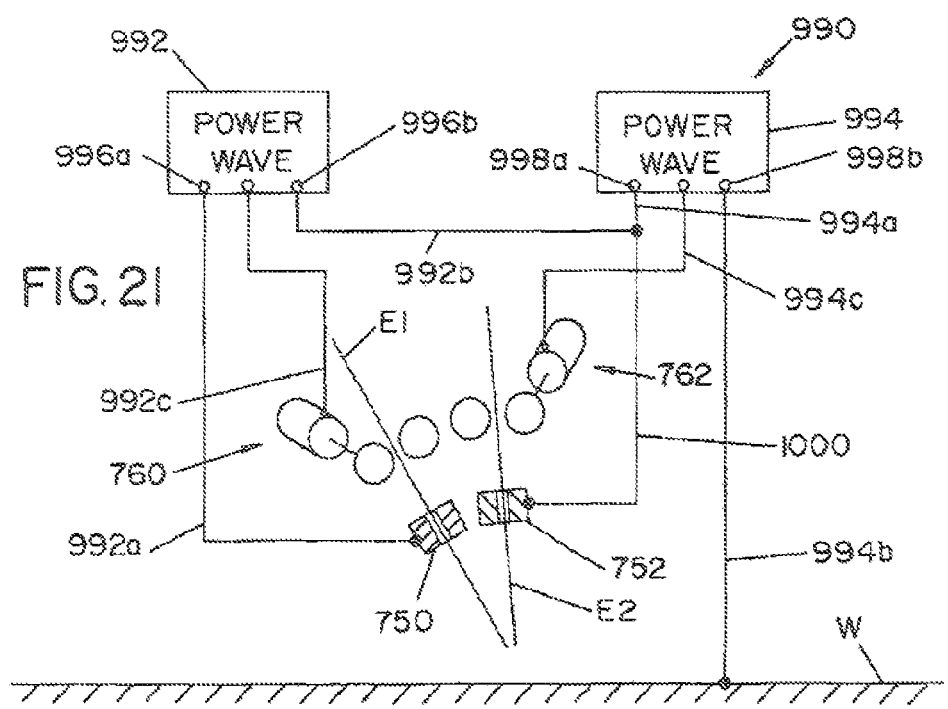

NEGATIVE UNBALANCED SQUARE WAVE

POSITIVE UNBALANCED SQUARE WAVE

MODIFIED SERIES ARC WELDING AND IMPROVED CONTROL OF ONE SIDED SERIES ARC WELDING

PRIORITY

The present application is a continuation-in-part of and claims priority to U.S. patent application Ser. No. 11/327,736, filed Jan. 9, 2006, the entirety of which is fully incorporated herein by reference; and a continuation-in-part of and claims priority to U.S. application Ser. No. 11/465,999, filed Aug. 21, 2006; which is a continuation of U.S. application Ser. No. 10/754,836, filed Jan. 12, 2004, the entireties of which are fully incorporated herein by reference.

FIELD OF THE INVENTION

The present invention relates to the art of electric arc welding and more particularly to improved series arc welding and modified series arc welding.

INCORPORATION BY REFERENCE

Embodiments of the present invention are directed to an electric arc welding system utilizing high capacity alternating circuit power sources for driving two or more tandem electrodes of the type used in seam welding of large metal blanks. Although the invention can be used with any standard AC power supply with switches for changing the output polarity, exemplary embodiments use power supplies with the switching concept disclosed in Stava U.S. Pat. No. 6,111,216 wherein the power supply is an inverter having two large output polarity switches with the arc current being reduced before the switches reverse the polarity. The power source can be a chopper operated at high switching speeds. Consequently, the term "switching point" is a complex procedure whereby the power supply is first turned off awaiting a current less than a preselected value, such as 100 amperes. Upon reaching the 100 ampere threshold, the output switches of the power supply are reversed to reverse the polarity from the D.C. output link of the inverter. Thus, the "switching point" is an off output command, known as a "kill" command, to the power supply inverter followed by a switching command to reverse the output polarity. The kill output can be a drop to a decreased current level. This procedure is duplicated at each successive polarity reversal so the AC power supply reverses polarity only at a low current. In this manner, snubbing circuits for the output polarity controlling switches are reduced in size or eliminated. Since this switching concept is preferred to define the switching points as used in the present invention, Stava U.S. Pat. No. 6,111,216 is incorporated by reference as though fully set forth herein. The concept of an AC current for tandem electrodes is well known in the art. U.S. Pat. No. 6,207,929 discloses a system whereby tandem electrodes are each powered by a separate inverter type power supply. The frequency is varied to reduce the interference between alternating current in the adjacent tandem electrodes. Indeed, this prior patent of assignee relates to single power sources for driving either a DC powered electrode followed by an AC electrode or two or more AC driven electrodes. In each instance, a separate inverter type power supply is used for each electrode and, in the alternating current high capacity power supplies, the switching point concept of Stava U.S. Pat. No. 6,111,216 is employed. This system for separately driving each of the tandem electrodes by a separate high capacity power supply is background information to the present invention and is incorporated herein as such background. In a like manner, U.S. Pat. No. 6,291,798 discloses a further arc welding system wherein each electrode in a tandem welding operation is driven by two or more independent power supplies connected in parallel with a single electrode arc. The system involves a single set of switches having two or more accurately balanced power supplies forming the input to the polarity reversing switch network operated in accordance with Stava U.S. Pat. No. 6,111,216. Each of the power supplies is driven by a single command signal and, therefore, shares the identical current value combined and directed through the polarity reversing switches. This type system requires large polarity reversing switches since all of the current to the electrode is passed through a single set of switches. U.S. Pat. No. 6,291,798 does show a master and slave combination of power supplies for a single electrode and discloses general background information to which the invention is directed. For that reason, this patent is also incorporated by reference as though fully set forth herein. An improvement for operating tandem electrodes with controlled switching points is disclosed in Houston U.S. Pat. No. 6,472,634. This patent is incorporated by reference.

The tandem electrodes of the present invention have two leading electrodes as disclosed in Shutt U.S. Pat. No. 4,246,463 and in a publication by The Lincoln Electric Company of Cleveland, Ohio entitled "Another Arc Welding Development." These items showing a modified series lead electrode revision of a tandem arc welder, i.e. welder system, are incorporated by reference herein as background technology which need not be revisited.

BACKGROUND OF INVENTION

Welding applications, such as pipe and plate welding, often require high currents and use several arcs created by tandem electrodes. Such welding systems are quite prone to certain inconsistencies caused by arc disturbances due to magnetic interaction between two adjacent tandem electrodes. A system for correcting the disadvantages caused by adjacent AC driven tandem electrodes is disclosed in Stava U.S. Pat. No. 6,207,929. In that prior patent, each of the AC driven electrodes has its own inverter based power supply. The output frequency of each power supply is varied so as to prevent interference between adjacent electrodes. This system requires a separate power supply for each electrode. As the current demand for a given electrode exceeds the current rating of the inverter based power supply, a new power supply must be designed, engineered and manufactured. Thus, such system for operating tandem welding electrodes require high capacity or high rated power supplies to obtain high current as required for pipe welding. To decrease the need for special high current rated power supplies for tandem operated electrodes, assignee developed the system disclosed in Stava U.S. Pat. No. 6,291,798 wherein each AC electrode is driven by two or more inverter power supplies connected in parallel. These parallel power supplies have their output current combined at the input side of a polarity switching network. Thus, as higher currents are required for a given electrode, two or more parallel power supplies are used. In this system, each of the power supplies is operated in unison and share equally the output current. Thus, the current required by changes in the welding conditions can be provided only by the over current rating of a single unit. A current balanced system did allow for the combination of several smaller power supplies; however, the power supplies had to be connected in parallel on the input side of the polarity reversing switching network. As such, large switches were required for each electrode. Consequently, such system overcame the disadvantage of requiring special power supplies for each electrode in a tandem welding operation of the type used in pipe welding; but, there is still the disadvantage that the switches must be quite large and the input, paralleled power supplies must be accurately matched by being driven from a single current command signal. Stava U.S. Pat. No. 6,291,798 does utilize the concept of a synchronizing signal for each welding cell directing current to each tandem electrode. However, the system still required large switches. This type of system was available for operation in an ethernet network interconnecting the welding cells. In ethernet interconnections, the timing cannot be accurately controlled. In the system described, the switch timing for a given electrode need only be shifted on a time basis, but need not be accurately identified for a specific time. Thus, the described system requiring balancing the current and a single switch network has been the manner of obtaining high capacity current for use in tandem arc welding operations when using an ethernet network or an internet and ethernet control system. There is a desire to control welders by an ethernet network, with or without an internet link. Due to timing limitation, these networks dictated use of tandem electrode systems of the type using only general synchronizing techniques.

Such systems could be controlled by a network; however, the parameter to each paralleled power supply could not be varied. Each of the cells could only be offset from each other by a synchronizing signal. Such systems were not suitable for central control by the internet and/or local area network control because an elaborate network to merely provide offset between cells was not advantageous. Houston U.S. Pat. No. 6,472,634 discloses the concept of a single AC arc welding cell for each electrode wherein the cell itself includes one or more paralleled power supplies each of which has its own switching network. The output of the switching network is then combined to drive the electrode. This allows the use of relatively small switches for polarity reversing of the individual power supplies paralleled in the system. In addition, relatively small power supplies can be paralleled to build a high current input to each of several electrodes used in a tandem welding operation. The use of several independently controlled power supplies paralleled after the polarity switch network for driving a single electrode allows advantageous use of a network, such as the internet or ethernet.

In Houston U.S. Pat. No. 6,472,634, smaller power supplies in each system is connected in parallel to power a single electrode. By coordinating switching points of each paralleled power supply with a high accuracy interface, the AC output current is the sum of currents from the paralleled power supplies without combination before the polarity switches. By using this concept, the ethernet network, with or without an Internet link, can control the weld parameters of each paralleled power supply of the welding system. The timing of the switch points is accurately controlled by the novel interface, whereas the weld parameters directed to the controller for each power supply can be provided by an ethernet network which has no accurate time basis. Thus, an internet link can be used to direct parameters to the individual power supply controllers of the welding system for driving a single electrode. There is no need for a time based accuracy of these weld parameters coded for each power supply. In the preferred implementation, the switch point is a "kill" command awaiting detection of a current drop below a minimum threshold, such as 100 amperes. When each power supply has a switch command, then they switch. The switch points between parallel power supplies, whether instantaneous or a sequence involving a "kill" command with a wait delay, are coordinated accurately by an interface card having an accuracy of less than 10 μs and preferably in the range of 1-5 μs. This timing accuracy coordinates and matches the switching operation in the paralleled power supplies to coordinate the AC output current.

By using the internet or ethernet local area network, the set of weld parameters for each power supply is available on a less accurate information network, to which the controllers for the paralleled power supplies are interconnected with a high accuracy digital interface card. Thus, the switching of the individual, paralleled power supplies of the system is coordinated. This is an advantage allowing use of the internet and local area network control of a welding system. The information network includes synchronizing signals for initiating several arc welding systems connected to several electrodes in a tandem welding operation in a selected phase relationship. Each of the welding systems of an electrode has individual switch points accurately controlled while the systems are shifted or delayed to prevent magnetic interference between different electrodes. This allows driving of several AC electrodes using a common information network. The Houston U.S. Pat. No. 6,472,634 system is especially useful for paralleled power supplies to power a given electrode with AC current. The switch points are coordinated by an accurate interface and the weld parameter for each paralleled power supply is provided by the general information network. This background is technology developed and patented by assignee and does not necessarily constitute prior art just because it is herein used as "background."

As a feature of the system in Stava U.S. Pat. No. 6,207,929, two or more power supplies can drive a single electrode. Thus, the system comprises a first controller for a first power supply to cause the first power supply to create an AC current between the electrode and workpiece by generating a switch signal with polarity reversing switching points in general timed relationship with respect to a given system synchronizing signal received by the first controller. This first controller is operated at first welding parameters in response to a set of first power supply specific parameter signals directed to the first controller. There is provided at least one slave controller for operating the slave power supply to create an AC current between the same electrode and workpiece by reversing polarity of the AC current at switching points. The slave controller operates at second weld parameters in response to the second set of power supply specific parameter signals to the slave controller. An information network connected to the first controller and the second or slave controller contains digital first and second power supply specific parameter signals for the two controllers and the system specific synchronizing signal. Thus, the controllers receive the parameter signals and the synchronizing signal from the information network, which may be an ethernet network with or without an internet link, or merely a local area network. The invention involves a digital interface connecting the first controller and the slave controller to control the switching points of the second or slave power supply by the switch signal from the first or master controller. In practice, the first controller starts a current reversal at a switch point. This event is transmitted at high accuracy to the slave controller to start its current reversal process. When each controller senses an arc current less than a given number, a "ready signal" is created. After a "ready" signal from all paralleled power supplies, all power supplies reverse polarity. This occurs upon receipt of a strobe or look command each 25 μs. Thus, the switching is in unison and has a delay of less than 25 μs. Consequently, both of the controllers have interconnected data controlling the switching points of the AC current to the single electrode. The same controllers receive parameter information and a synchronizing signal from an information network which in practice comprises a combination of internet and ethernet or a local area ethernet network. The timing accuracy of the digital interface is less than about 10 µs and, preferably, in the general range of 1-5 µs. Thus, the switching points for the two controllers driving a single electrode are commanded within less than 5 µs. Then, switching actually occurs within 25 µs. At the same time, relatively less time sensitive information is received from the information network also connected to the two controllers driving the AC current to a single electrode in a tandem welding operation. The 25 µs maximum delay can be changed, but is less than the switch command accuracy.

The unique control system disclosed in Houston U.S. Pat. No. 6,472,634 is used to control the power supply for tandem electrodes used primarily in pipe seam welding and disclosed in Stava U.S. Pat. No. 6,291,798. This Stava patent relates to a series of tandem electrodes movable along a welding path to lay successive welding beads in the space between the edges of a rolled pipe or the ends of two adjacent pipe sections. The individual AC waveforms used in this unique technology are created by a number of current pulses occurring at a frequency of at least 18 kHz with a magnitude of each current pulse controlled by a wave shaper. This technology dates back to Blankenship U.S. Pat. No. 5,278,390. Shaping of the waveforms in the AC currents of two adjacent tandem electrodes is known and is shown in not only the patents mentioned above, but in Stava U.S. Pat. No. 6,207,929. In this latter Stava patent, the frequency of the AC current at adjacent tandem electrodes is adjusted to prevent magnetic interference. All of these patented technologies by The Lincoln Electric Company of Cleveland, Ohio have been advances in the operation of tandem electrodes each of which is operated by a separate AC waveform created by the waveform technology set forth in these patents. These patents are incorporated by reference herein in their entirety. However, these patents do not disclose the present invention which is directed to the use of such waveform technology for use in tandem welding by adjacent electrodes each using an AC current. This technology, as the normal transformer technology, has experienced difficulty in controlling the dynamics of the weld puddle. Thus, there is a need for an electric arc welding system for adjacent tandem electrodes which is specifically designed to control the dynamics and physics of the molten weld puddle during the welding operation. These advantages can not be obtained by merely changing the frequency to reduce the magnetic interference.

To control penetration by the lead electrode in tandem electric arc welding or welding system, a unique leading electrode arrangement has been used for a number of years. The initial concept involved two moving lead electrodes connected to the power source in a series so current would flow from the tip of one electrode to the tip of the adjacent electrode. Both of these electrodes were movable toward a common point at the weld puddle in the groove between the edges of the workpiece being welded. By using a series arrangement, one electrode was connected to the work terminal of the power source and the other was connected to the normal electrode terminal. All of the power was between the electrodes and not between the electrode and the workpiece. Consequently, there was essentially zero arc force. The electrodes were melted by the current flow between the electrodes. This provided a double deposition rate with a substantially reduced heat input to the weld puddle. The heat to the puddle was, thus, decreased. The disadvantage of the series electrode concept was that there was very little penetration. The arc did not extend to the workpiece. The metal was deposited into the joint between the edges of the workpiece primarily by gravity. To increase the penetration of the lead arc by the two series electrodes, the trailing electrode was also connected to machine ground. This concept is disclosed in Shutt U.S. Pat. No. 4,246,463. In this arrangement, the arc traveled between the two electrodes and from the lead electrode to the workpiece. With two 3/16 inch electrodes, the modified series arc system had the current from the lead electrode flowing through two paths back to the power source. The current either passed to the trailing electrode or to the workpiece. In practice, the ratio of current flow from the lead electrode back to the power source is approximately 1/3 through the work and 2/3 through the electrode. The work had substantially more resistance in the return parallel circuit. This arrangement doubled the deposition rate. The amount of current into the plate or workpiece was about 30% of the total current of the welding operation. Consequently, there was double deposition rate and decreased heat into the plate. Penetration was caused by the modified series circuit connection of the two lead electrodes. This single side welding of heavy workpieces has not been used extensively because the frequency of the AC current in the series connected electrodes was controlled by the line frequency of the power source. The wire feeder for each of the electrodes was controlled by the same power source. This limited the relationship of the two motors driving the wire feeders. The input voltage and frequency of the power source was used to drive both wire feeders. Consequently, using the prior art system with all of its apparent advantages could be accomplished in only a relatively small range of currents and with only certain limited electrode sizes. Thus, using the prior art system was restricted. There had to be a tuning of the current and input frequency for proper melting, penetration and wire feed speed. The parameters of the power source and the interrelationship of the two independently driven wire feeders rendered the advantageous prior welding technique of a tandem arc welder where the two electrodes are connected in series and driven by AC current to be quite limited. Since there is a limited application of this technology, it was not possible to sell series connected tandem electrode equipment for general purpose electric arc welding. Consequently, the advantages of modified series connected electrodes in a tandem welding system has essentially lay dormant through the many years of its existence.

SUMMARY OF THE INVENTION

To render universally acceptable and usable, a tandem electric arc welder or system having two lead electrodes connected in a modified series circuit, the present invention was developed. By using embodiments of the present invention, large plates can be welded from one side in a submerged arc welding operation, with an arc force causing penetration while the series connected electrodes substantially increase the deposition. By using embodiments of the present invention, a root weld bead is deposited by the two series connected lead electrodes. This joins the two spaced edges of the workpiece together. In practice the large plates are ship sheet plates or the ends of pipe segments in pipe welding. Embodiments of the present invention modify the well known series connected lead electrode concept for tandem welding so that such a welder can be used with a large variety of currents and a large variety of electrodes, both size and material. This is a substantial advance in the electric arc welding field and solves the reason for the lack of use of the modified series connected tandem electrodes in one side, submerged arc welding. The modification can be used in other types of welding.

In accordance with embodiments of the present invention, there is provided an electric arc welder for depositing weld metal along the groove between edges of a metal workpiece. The welder comprises an electrode driven by the wire feeder toward a point in the groove. A second electrode is driven by a second wire feeder toward the same point in the groove. A main power source is connected to the electrode with a first output terminal of the power source connected to the first electrode and a second output terminal of the main power source connected to both the second electrode and directly or indirectly to the metal workpiece. The welder includes two return paths, one through the second electrode and one through the workpiece. The power source includes a high speed switching output stage such as an inverter chopper. This stage creates current with a selected AC waveform between the first and second output terminals of the main power source. The waveform of the main power source is generated by a waveform generator controlling a pulse width modulator circuit normally a digital circuit, but in some instances it is an analog PWM circuit. The pulse width modulator circuit, digital or analog, determines the current operation of the output stage of the main power source. A device is used to move the electrodes in unison along the groove in a given direction. These electrodes form the lead electrodes in a tandem electrode arc welder or electric arc welding system. In accordance with an exemplary embodiment of the present invention, a third, fourth or fifth electrode is connected behind the first and second series connected electrodes. Each of these following electrodes is movable with the first series connected electrodes. In practice, they are movable on the same mechanism or tractor; however, they could be moved separately and still be "generally movable" with the first and second series connected electrodes. The third or subsequent electrodes are each powered by an auxiliary power source different from the main power source, with the first output terminal connected to the third electrode and a second output terminal connected to the workpiece. This is a standard connection for the trailing electrodes of a tandem welding operation.

Still a further aspect of the present invention is the provision of an electric arc welder as defined above wherein the auxiliary power source for the tailing electrodes also includes a high speed switching output stage, such as an inverter or chopper. This output stage creates a selected trailing waveform between the first and second output terminals of the auxiliary power source. The trailing waveform of the auxiliary power source is generated by a waveform generator controlling the pulse width modulator circuit, either digital or analog, to determine the current operation of the output stage of the auxiliary power source. The number of power sources, as shown in the prior art, can vary according to the number of trailing electrodes. Indeed, one power source can operate two trailing electrodes or two power sources can operate a single trailing electrode. These are all variations used in tandem electric arc welding as defined in the various patents incorporated by reference herein.

In accordance with an aspect of the invention, the trailing waveforms of the trailing electrodes are also an AC waveform, such as used in the series connected lead electrodes of the electric welder constructed in accordance with aspects of the present invention. Of course, the trailing electrodes could have waveforms which are DC waveforms created by the waveform generator producing a steady output signal for determining the magnitude of the DC waveform. In this instance, waveform is a level of current, whereas "waveform" is used in this application primarily to mean a repeating AC waveform.

In accordance with another aspect of the present invention, the main power source includes a first and second module power source connected in parallel with the output terminals of the main power source. To provide greater current, a second module is connected in parallel with a first module. The two power source modules are defined as the "main" power source driving the series connected lead electrodes of the present invention. In an exemplary implementation, a second power source is connected in series between the second electrode and the workpiece. In this arrangement, one terminal of the main power source and a terminal of the second power source are connected in series and to the second electrode. The second power source is in the workpiece path. By using two power sources, the separate independently driven wire feeders for the two series connected electrodes can be controlled by different power sources. This prevents a complicated software development when a single power source is used to drive the separate two wire feeders used for the lead electrodes of the invention. Consequently, there is an advantage of using two separate power sources, with each of the power sources having a wire feed control circuit that can be adjusted to optimize the wire feeder of each of the series connected electrodes forming the lead electrodes of the tandem welding system obtained by the present invention.

Embodiments of the present invention are primarily used for one sided welding on large plates. In this context, the invention also includes the concept of a back plate below the groove accepting the weld metal. The back plate is on the underside of the workpiece and normally provides a trough with flux that controls the backside weld bead configuration. In accordance with an aspect, there is a flux dispenser in front of the trailing electrodes. Thus, the trailing electrodes are used for submerged arc welding. In practice, the first series electrodes are either gas shielded or provided with a flux dispenser to create a submerged arc welding process for the first two electrodes.

By using embodiments of the present invention, the waveform generator for the main power source is provided with a circuit to adjust the frequency of the AC waveform between the series connected lead electrodes. In this manner, the frequency of the AC waveform used in the series connected electrodes is not dictated in any fashion by the frequency of line voltage to the main power source. By adjusting the frequency of the waveform, the welding operation for the series connected electrodes can be modulated to accommodate different diameter electrodes, electrodes with different material and a variety of currents to customize the welding operation in a manner not available in the prior art. Furthermore, the waveform generator of the present invention has a circuit for adjusting duty cycles of the AC waveforms from the main power source. Thus, the welding operation can be adjusted between penetration and deposition to customize the operation of the weld process. To accomplish this objective, the magnitude of the positive current portion of the waveform are controlled independently or as a percentage of the magnitude of the negative portion of the AC waveform. All of these adjustment circuits allow the main power source to be adjusted in frequency, duty cycle and/or amplitudes to customize the welder for providing an optimized welding process, while still employing the tremendously advantageous series connected electrodes.

A primary object of embodiments of the present invention is the provision of a tandem electric arc welder wherein the lead electrodes are connected in series, which welder includes an AC current waveform in the two series connected electrodes, which waveform can be adjusted to customize the welding operation performed by the lead electrodes in the tandem electrode welder.

Another object of embodiments of the present invention is the provision of an electric arc welder, as defined above, which electric arc welder can use different electrodes and different current settings to perform the AC arc welding process with the series connected lead electrodes.

Yet another object of embodiments of the present invention is the provision of an electric arc welder, as defined above, which electric arc welder has the capabilities of adjusting the frequency of the waveform, the duty cycle of the waveform and/or the magnitude of the current in the positive and negative portions of the waveform so that the welding process performed by the lead series connected electrodes are customized.

These and other objects and advantages will become apparent from the following description taken together with the accompanying drawings.

BRIEF DESCRIPTION OF DRAWINGS

The above and/or other aspects of the invention will be more apparent by describing in detail exemplary embodiments of the invention with reference to the accompanying drawings, in which:

FIGS. 9 and 10 are schematic drawings illustrating the dynamics of the weld puddle during concurrent polarity relationships of tandem electrodes;

FIG. 11 is a pair of current graphs showing the waveforms on two adjacent tandem electrodes;

FIG. 20 is a partial side elevational view of an exemplary embodiment of the present invention illustrating only the lead series connected electrode used in the present invention with a modification of the main power source;

FIG. 21 is a view similar to FIG. 20 showing an exemplary embodiment and practical embodiment now used for the main power source and the workpiece path of the present invention;

DETAILED DESCRIPTION OF EXEMPLARY EMBODIMENTS

Figure 1:
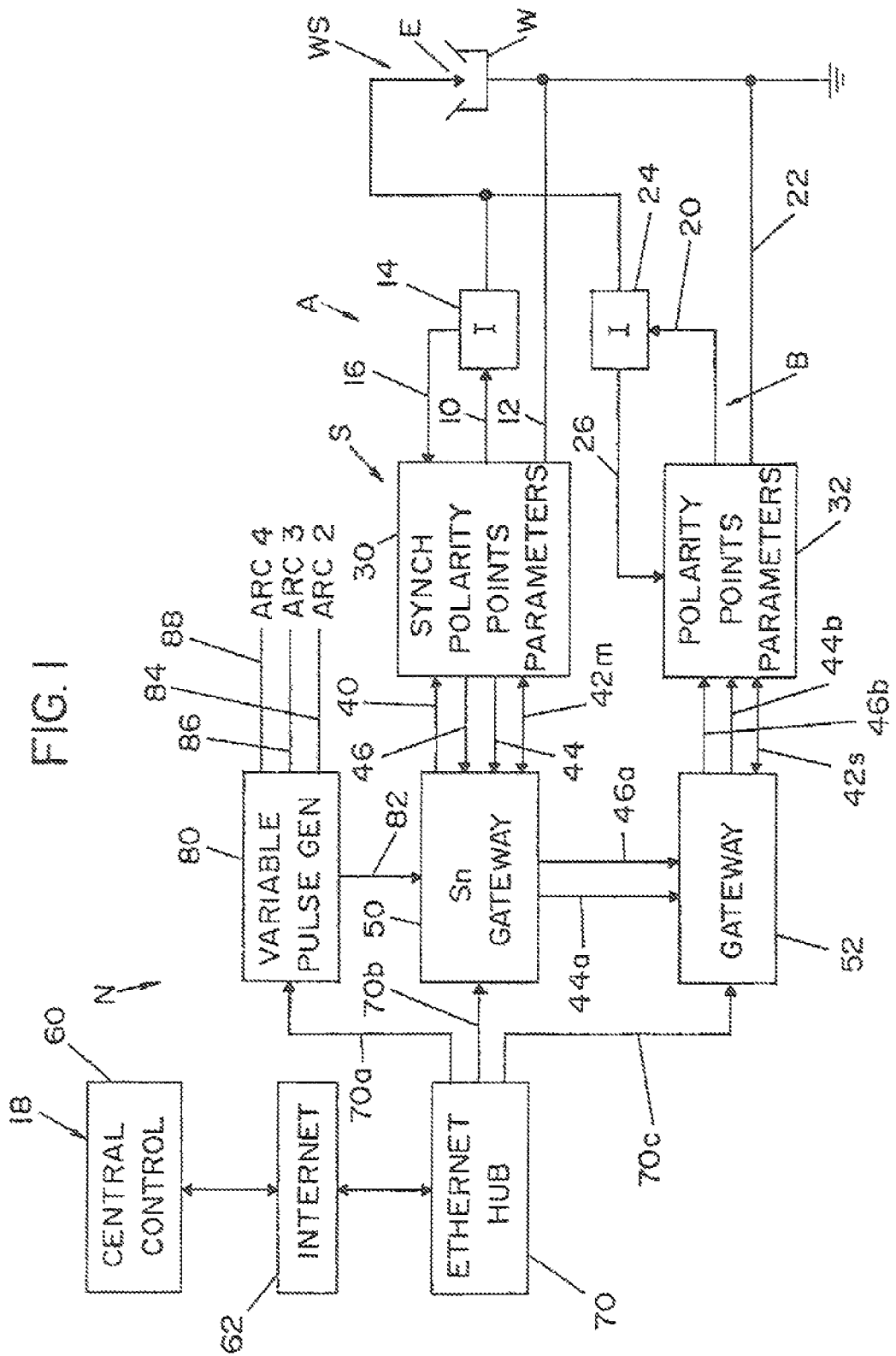
FIG. 1 is a block diagram of a welder used to practice an exemplary embodiment of the present invention.
Figure 2:
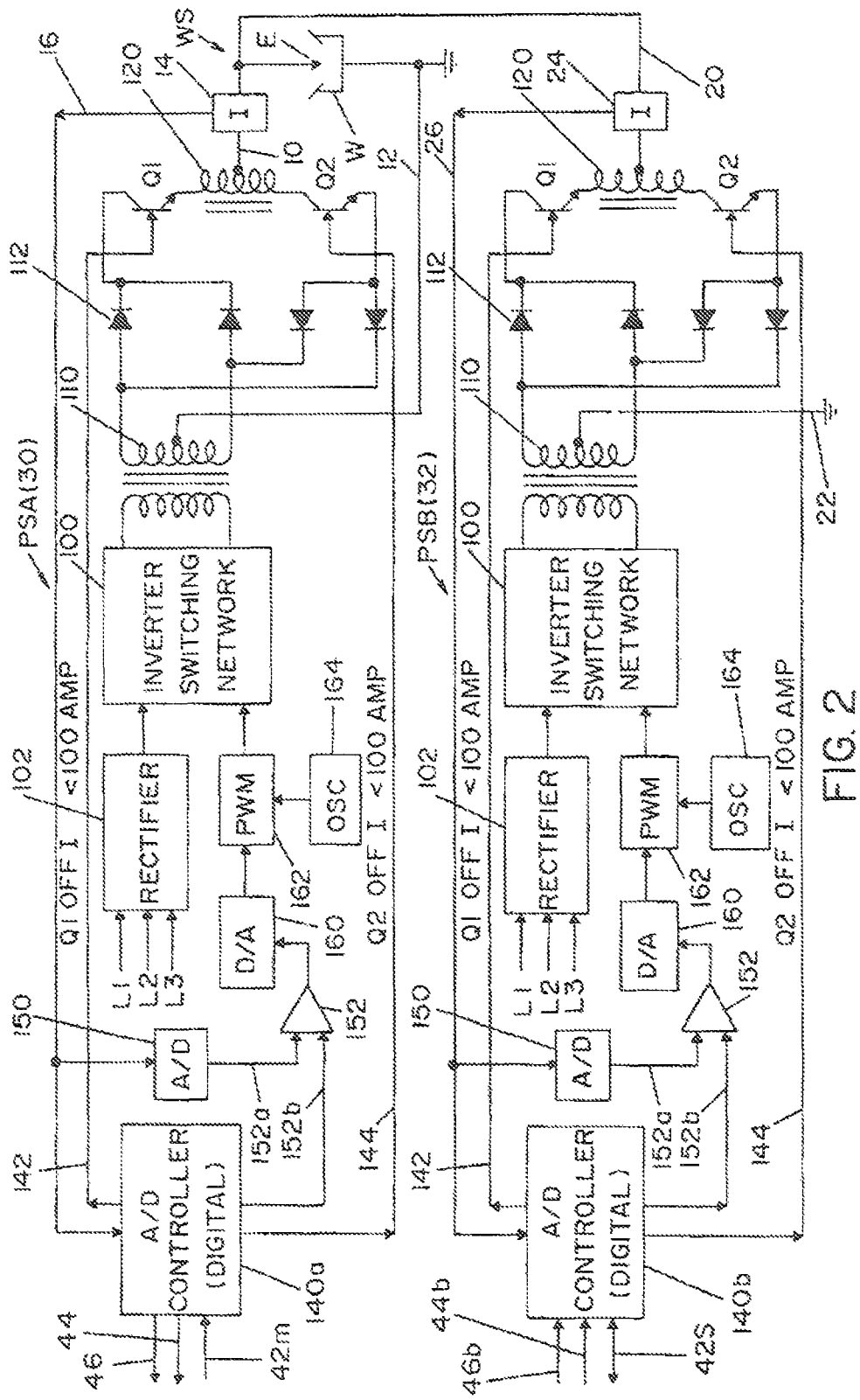
FIG. 2 is a wiring diagram of two paralleled power supplies; each of which include a switching output which power supplies.
Figure 5:
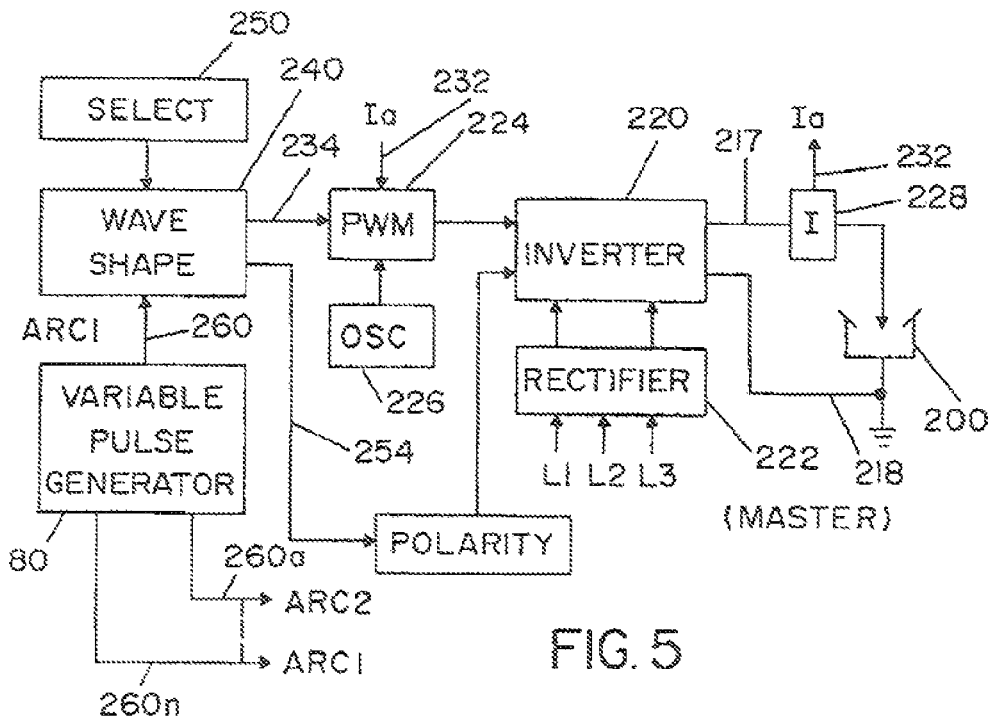
FIG. 5 is a block diagram showing a single electrode driven by the system as shown in FIG. 4 with a variable pulse generator disclosed in Houston U.S. Pat. No. 6,472,634.
Figure 16:
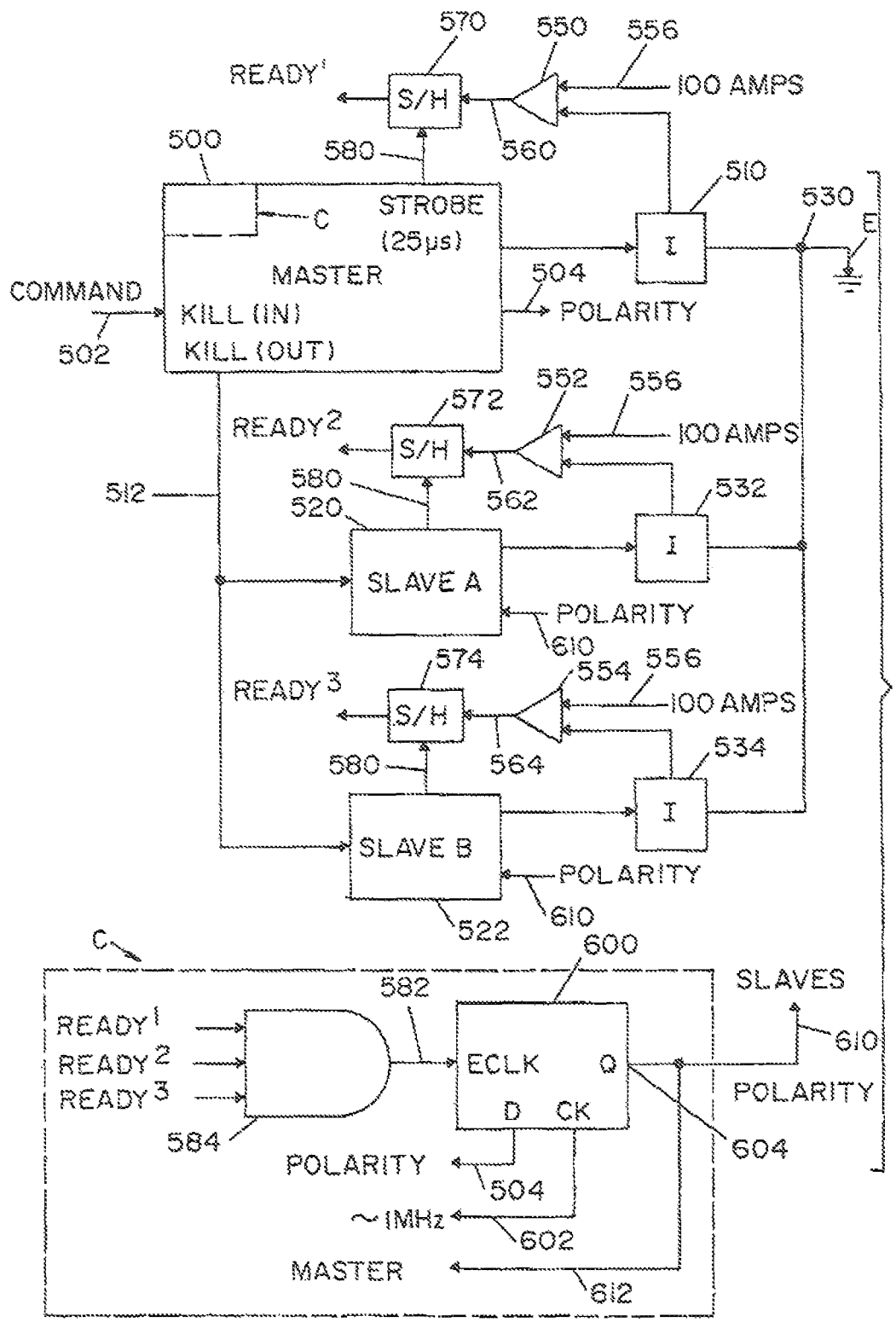
FIG. 16 is a schematic layout of the software program to cause switching of the paralleled power supplies as soon as the coordinated switch commands have been processed and the next coincident signal has been created.

Referring now to the drawings wherein the showings are for the purpose of illustrating exemplary embodiments of the invention only and not for the purpose of limiting the same, a system used in practicing the invention is shown in detail in FIGS. 1, 2 and 16. In FIG. 1 there is a single electric arc welding system S in the form of a single cell to create an alternating current as an arc at weld station WS. This system or cell includes a first master welder A with output leads 10, 12 in series with electrode E and workpiece W in the form of a pipe seam joint or other welding operation. Hall effect current transducer 14 provides a voltage in line 16 proportional to the current of welder A. Less time critical data, such as welding parameters, are generated at a remote central control 18. In a like manner, a slave following welder B includes leads 20, 22 connected in parallel with leads 10, 12 to direct an additional AC current to the weld station WS. Hall effect current transducer 24 creates a voltage in line 26 representing current levels in welder B during the welding operation. Even though a single slave or follower welder B is shown, any number of additional welders can be connected in parallel with master welder A to produce an alternating current across electrode E and workpiece W. The AC current is combined at the weld station instead of prior to a polarity switching network. Each welder includes a controller and inverter based power supply illustrated as a combined master controller and power supply 30 and a slave controller and power supply 32. Controllers 30, 32 receive parameter data and synchronization data from a relatively low level logic network. The parameter information or data is power supply specific whereby each of the power supplies is provided with the desired parameters such as current, voltage and/or wire feed speed. A low level digital network can provide the parameter information; however, the AC current for polarity reversal occurs at the same time. The "same" time indicates a time difference of less than 10 μs and preferably in the general range of 1-5 μs. To accomplish precise coordination of the AC output from power supply 30 and power supply 32, the switching points and polarity information can not be provided from a general logic network wherein the timing is less precise. The individual AC power supplies are coordinated by high speed, highly accurate DC logic interface referred to as "gateways." As shown in FIG. 1, power supplies 30, 32 are provided with the necessary operating parameters indicated by the bi-directional leads 42*m*, 42*s*, respectively. This non-time sensitive information is provided by a digital network shown in FIG. 1. Master power supply 30 receives a synchronizing signal as indicated by unidirectional line 40 to time the controllers operation of its AC output current. The polarity of the AC current for power supply 30 is outputted as indicated by line 46. The actual switching command for the AC current of master power supply 30 is outputted on line 44. The switch command tells power supply S, in the form of an inverter, to "kill," which is a drastic reduction of current. In an alternative, this is actually a switch signal to reverse polarity. The "switching points" or command on line 44 preferably is a "kill" and current reversal commands utilizing the "switching points" as set forth in Stava U.S. Pat. No. 6,111,216. Thus, timed switching points or commands are outputted from power supply 30 by line 44. These switching points or commands may involve a power supply "kill" followed by a switch ready signal at a low current or merely a current reversal point. The switch "ready" is used when the "kill" concept is implemented because neither inverters are to actually reverse until they are below the set current. This is described in FIG. 16. The polarity of the switches of controller 30 controls the logic on line 46. Slave power supply 32 receives the switching point or command logic on line 44*b* and the polarity logic on line 46*b*. These two logic signals are interconnected between the master power supply and the slave power supply through the highly accurate logic interface shown as gateway 50, the transmitting gateway, and gateway 52, the receiving gateway on lines 44*a*, 46*a*. These gateways are network interface cards for each of the power supplies so that the logic on lines 44*b*, 46*b* are timed closely to the logic on lines 44, 46, respectively. In practice, network interface cards or gateways 50, 52 control this logic to within 10 μs and preferably within 1-5 μs. A low accuracy network controls the individual power supplies for data from central control 18 through lines 42*m*, 42*s*, illustrated as provided by the gateways or interface cards. These lines contain data from remote areas (such as central control 18) which are not time sensitive and do not use the accuracy characteristics of the gateways. The highly accurate data for timing the switch reversal uses interconnecting logic signals through network interface cards 50, 52. The system in FIG. 1 is a single cell for a single AC arc; however, embodiments of the invention are directed to tandem electrodes wherein two or more AC arcs are created to fill the large gap found in pipe welding. Thus, the master power supply 30 for the first electrode receives a synchronization signal which determines the timing or phase operation of the system S for a first electrode, i.e. ARC 1. System S is used with other identical systems to generate ARCs 2, 3, and 4 timed by synchronizing outputs 84, 86 and 88. This concept is schematically illustrated in FIG. 5. The synchronizing or phase setting signals 82-88 are shown in FIG. 1 with only one of the tandem electrodes. An information network N comprising a central control computer and/or web server 60 provides digital information or data relating to specific power supplies in several systems or cells controlling different electrodes in a tandem operation. Internet information 62 is directed to a local area network in the form of an ethernet network 70 having local interconnecting lines 70*a*, 70*b*, 70*c*. Similar interconnecting lines are directed to each power supply used in the four cells creating ARCs 1, 2, 3 and 4 of a tandem welding operation. The description of system or cell S applies to each of the arcs at the other electrodes. If AC current is employed, a master power supply is used. In some instances, merely a master power supply is used with a cell specific synchronizing signal. If higher currents are required, the systems or cells include a master and slave power supply combination as described with respect to system S of FIG. 1. In some instances, a DC arc is used with two or more AC arcs synchronized by generator 80. Often the DC arc is the leading electrode in a tandem electrode welding operation, followed by two or more synchronized AC arcs. A DC power supply need not be synchronized, nor is there a need for accurate interconnection of the polarity logic and switching points or commands. Some DC powered electrodes may be switched between positive and negative, but not at the frequency of an AC driven electrode. Irrespective of the make-up of the arcs, ethernet or local area network 70 includes the parameter information identified in a coded fashion designated for specific power supplies of the various systems used in the tandem welding operation. This network also employs synchronizing signals for the several cells or systems whereby the systems can be offset in a time relationship. These synchronizing signals are decoded and received by a master power supply as indicated by line 40 in FIG. 1. In this manner, the AC arcs are offset on a time basis. These synchronizing signals are not required to be as accurate as the switching points through network interface cards or gateways 50, 52. Synchronizing signals on the data network are received by a network interface in the form of a variable pulse generator 80. The generator creates offset synchronizing signals in lines 84, 86 and 88. These synchronizing signals dictate the phase of the individual alternating current cells for separate electrodes in the tandem operation. Synchronizing signals can be generated by interface 80 or actually received by the generator through the network 70. In practice, network 70 merely activates generator 80 to create the delay pattern for the many synchronizing signals. Also, generator 80 can vary the frequency of the individual cells by frequency of the synchronizing pulses if that feature is desired in the tandem welding operation.

A variety of controllers and power supplies could be used for practicing the system as described in FIG. 1; however, exemplary implementation of the system is set forth in FIG. 2 wherein power supply PSA is combined with controller and power supply 30 and power supply PSB is combined with controller and power supply 32. These two units are essentially the same in structure and are labeled with the same numbers when appropriate. Description of power supply PSA applies equally to power supply PSB. Inverter 100 has an input rectifier 102 for receiving three phase line current L1, L2, and L3. Output transformer 110 is connected through an output rectifier 112 to tapped inductor 120 for driving opposite polarity switches Q1, Q2. Controller 140*a* of power supply PSA and controller 140*b* of PSB are essentially the same, except controller 140*a* outputs timing information to controller 140*b*. Switching points or lines 142, 144 control the conductive condition of polarity switches Q1, Q2 for reversing polarity at the time indicated by the logic on lines 142, 144, as explained in more detail in Stava U.S. Pat. No. 6,111,216 incorporated by reference herein. The control is digital with a logic processor; thus, A/D converter 150 converts the current information on feedback line 16 or line 26 to controlling digital values for the level of output from error amplifier 152 which is illustrated as an analog error amplifier. In practice, this is a digital system and there is no further analog signal in the control architecture. As illustrated, however, amplifier has a first input 152a from converter 150 and a second input 152b from controller 140a or 140b. The current command signal on line 152b includes the wave shape or waveform required for the AC current across the arc at weld station WS. This is standard practice as taught by several patents of Lincoln Electric, such as Blankenship U.S. Pat. No. 5,278,390, incorporated by reference. See also Stava U.S. Pat. No. 6,207,929, incorporated by reference. The output from amplifier 152 is converted to an analog voltage signal by converter 160 to drive pulse width modulator 162 at a frequency controlled by oscillator 164, which is a timer program in the processor software. The shape of the waveform at the arcs is the voltage or digital number at lines 152b. The frequency of oscillator 164 is greater than 18 kHz. The total architecture of this system is digitized in the preferred embodiment of the present invention and does not include reconversion back into analog signal. This representation is schematic for illustrative purposes and is not intended to be limiting of the type of power supply used in practicing the present invention. Other power supplies could be employed.

Figure 3:
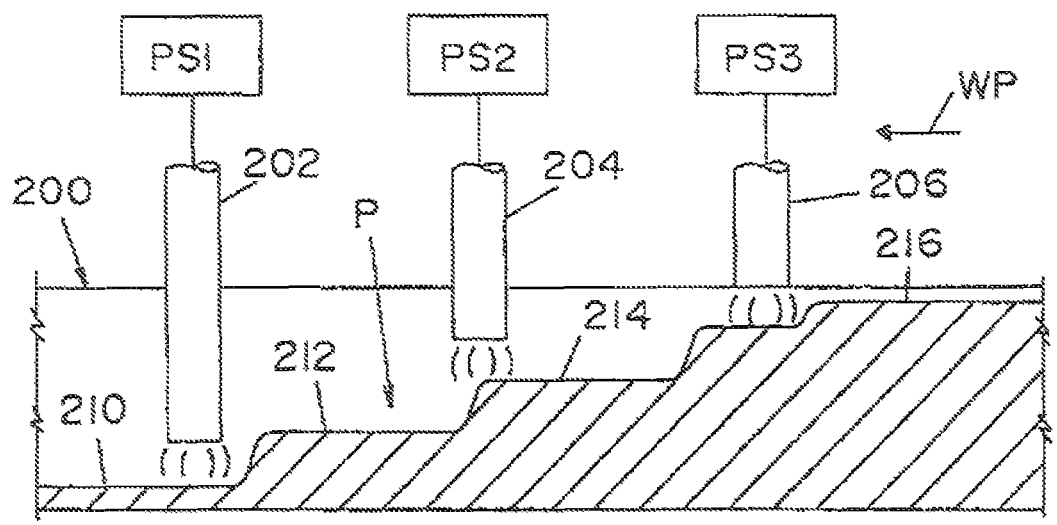
FIG. 3 is a cross sectional side view of three tandem electrodes for welding the seam of a pipe.
Figure 4:
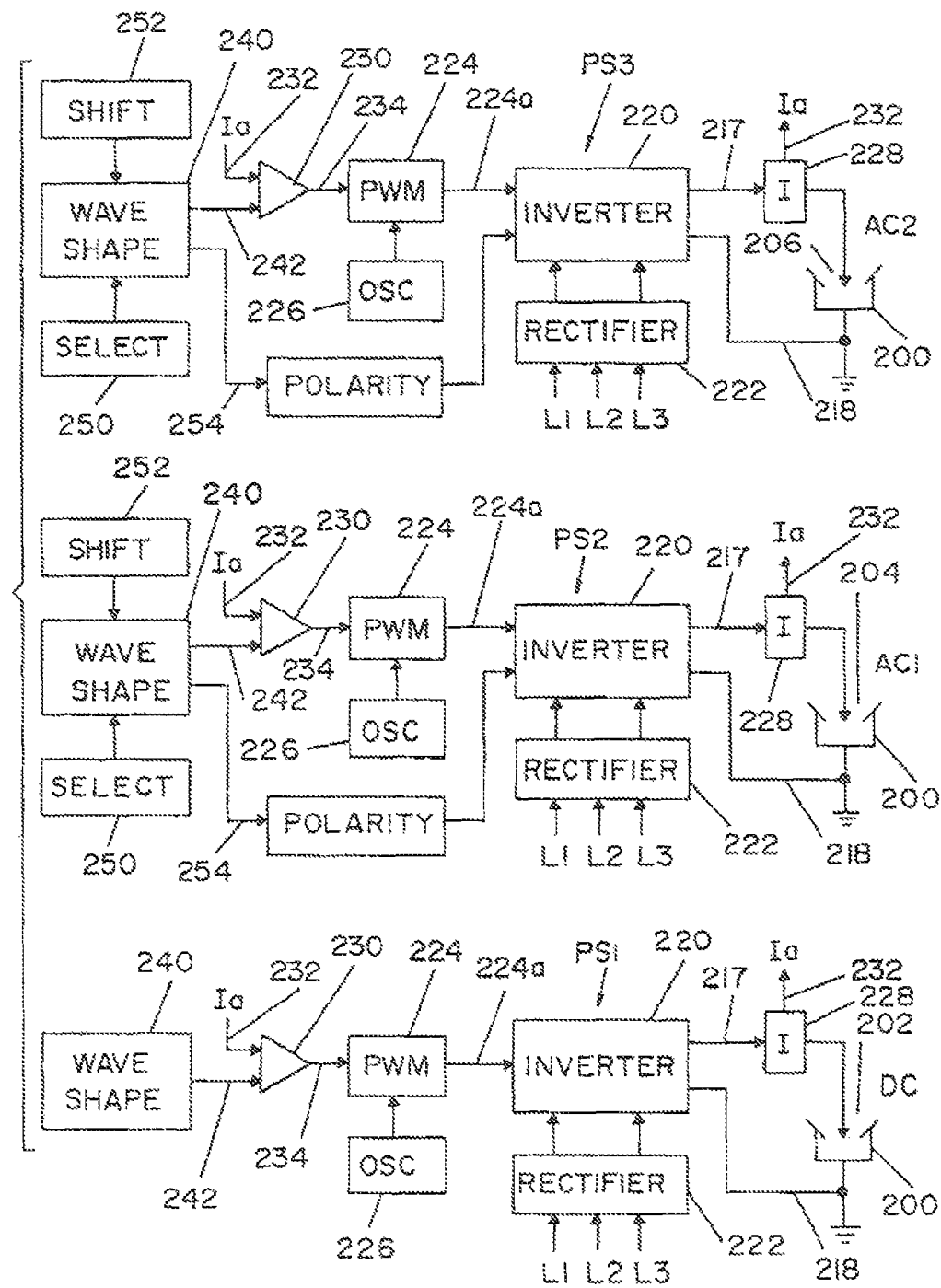
FIG. 4 is a schematic layout in block form of a welding system for three electrodes using the disclosure in Houston U.S. Pat. No. 6,472,634 and Stava U.S. Pat. No. 6,291,798.
Figure 7:
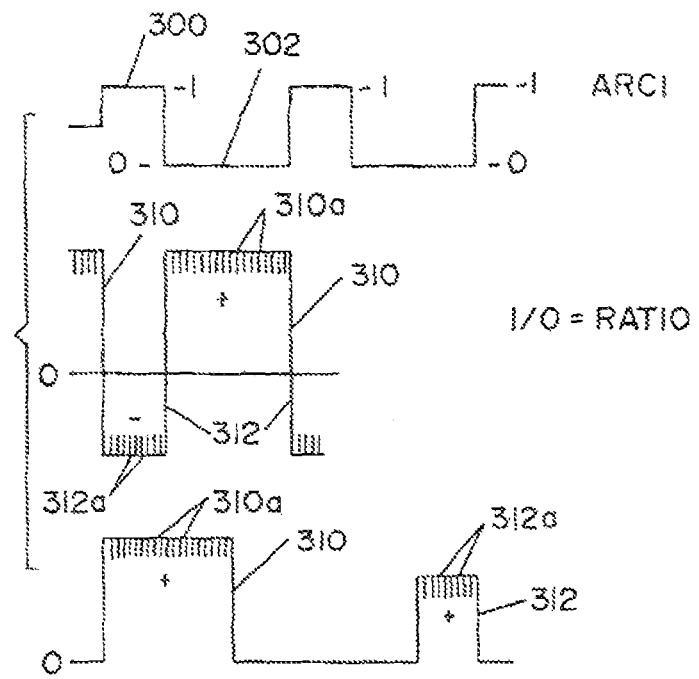
FIG. 7 is a current graph superimposed upon a signal having logic to determine the polarity of the waveform as used in practicing embodiments of the present invention.

The practice of embodiments of the present invention utilizing the concepts of FIGS. 1 and 2 are illustrated in FIGS. 3 and 4. Workpiece 200 is a seam in a pipe which is welded together by tandem electrodes 202, 204 and 206 powered by individual power supplies PS1, PS2, PS3, respectively. The power supplies can include more than one power source coordinated in accordance with the technology in Houston U.S. Pat. No. 6,472,634. The illustrated embodiment involves a DC arc for lead electrode 202 and an AC arc for each of the tandem electrodes 204, 206. The created waveforms of the tandem electrodes are AC currents and include shapes created by a wave shaper or wave generator in accordance with the previously described waveform technology. As electrodes 202, 204 and 206 are moved along weld path WP a molten metal puddle P is deposited in pipe seam 200 with an open root portion 210 followed by deposits 212, 214 and 216 from electrodes 202, 204 and 206, respectively. As previously described more than two AC driven electrodes as will be described and illustrated by the waveforms of FIG. 15, can be operated by the invention relating to AC currents of adjacent electrodes. The power supplies, as shown in FIG. 4, each include an inverter 220 receiving a DC link from rectifier 222. In accordance with Lincoln waveform technology, a chip or internal programmed pulse width modulator stage 224 is driven by an oscillator 226 at a frequency greater than 18 kHz and preferably greater than 20 kHz. As oscillator 226 drives pulse width modulator 224, the output current has a shape dictated by the wave shape outputted from wave shaper 240 as a voltage or digital numbers at line 242. Output leads 217, 218 are in series with electrodes 202, 204 and 206. The shape in real time is compared with the actual arc current in line 232 from Hall Effect transducer 228 by a stage illustrated as comparator 230 so that the outputs on line 234 controls the shape of the AC waveforms. The digital number or voltage on line 234 determines the output signal on line 224a to control inverter 220 so that the waveform of the current at the arc follows the selected profile outputted from wave shaper 240. This is standard Lincoln waveform technology, as previously discussed. Power supply PS1 creates a DC arc at lead electrode 202; therefore, the output from wave shaper 240 of this power supply is a steady state indicating the magnitude of the DC current. Some embodiments of the present invention do not relate to the formation of a DC arc. To the contrary, the present invention is the control of the current at two adjacent AC arcs for tandem electrodes, such as electrodes 204, 206. In accordance with the invention, wave shaper 240 involves an input 250 employed to select the desired shape or profile of the AC waveform. This shape can be shifted in real time by an internal programming schematically represented as shift program 252. Wave shaper 240 has an output which is a priority signal on line 254. In practice, the priority signal is a bit of logic, as shown in FIG. 7. Logic 1 indicates a negative polarity for the waveform generated by wave shaper 240 and logic 0 indicates a positive polarity. This logic signal or bit controller 220 directed to the power supply is read in accordance with the technology discussed in FIG. 16. The inverter switches from a positive polarity to a negative polarity, or the reverse, at a specific "READY" time initiated by a change of the logic bit on line 254. In practice, this bit is received from variable pulse generator 80 shown in FIG. 1 and in FIG. 5. The welding system shown in FIGS. 3 and 4 is used in practicing aspects of the invention wherein the shape of AC arc currents at electrodes 204 and 206 have novel shapes to obtain a beneficial result of the present invention, i.e. a generally quiescent molten metal puddle P and/or synthesized sinusoidal waveforms compatible with transformer waveforms used in arc welding. The electric arc welding system shown in FIGS. 3 and 4 have a program to select the waveform at "SELECT" program 250 for wave shaper 240. In this manner the unique waveforms of the present invention are used by the tandem electrodes. One of the power supplies to create an AC arc is schematically illustrated in FIG. 5. The power supply or source is controlled by variable pulse generator 80, shown in FIG. 1. Signal 260 from the generator controls the power supply for the first arc. This signal includes the synchronization of the waveform together with the polarity bit outputted by the wave shaper 240 on line 254. Lines 260a-260n control the desired subsequent tandem AC arcs operated by the welding system of the present invention. The timing of these signals shifts the start of the other waveforms. FIG. 5 merely shows the relationship of variable pulse generator 80 to control the successive arcs as explained in connection with FIG. 4.

Figure 6:
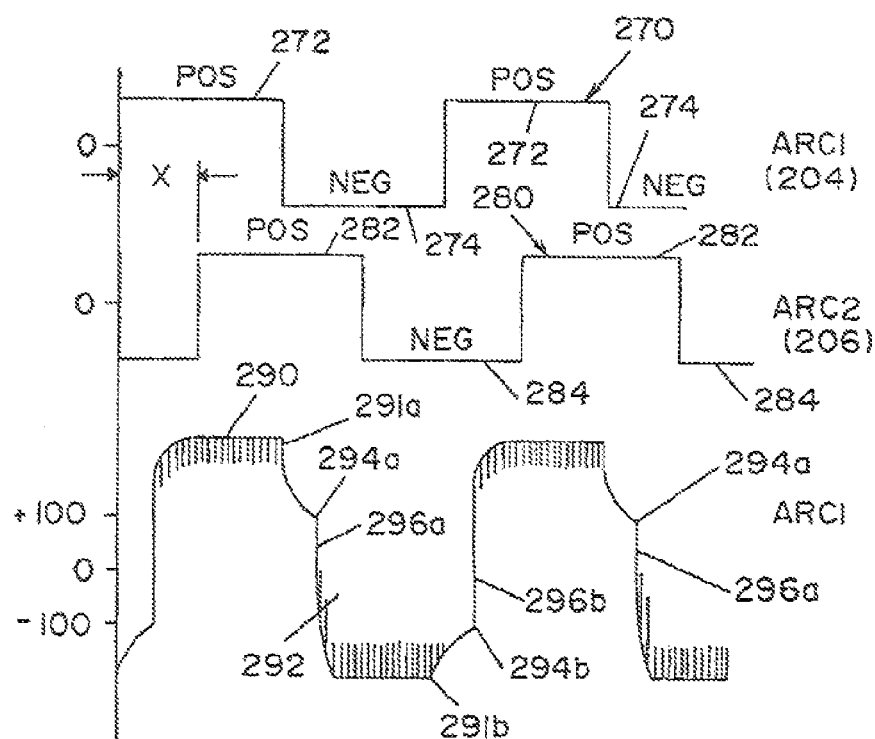
FIG. 6 is a current graph for one of two illustrated synchronizing pulses and showing a balanced AC waveform for one tandem electrode.
Figure 8:
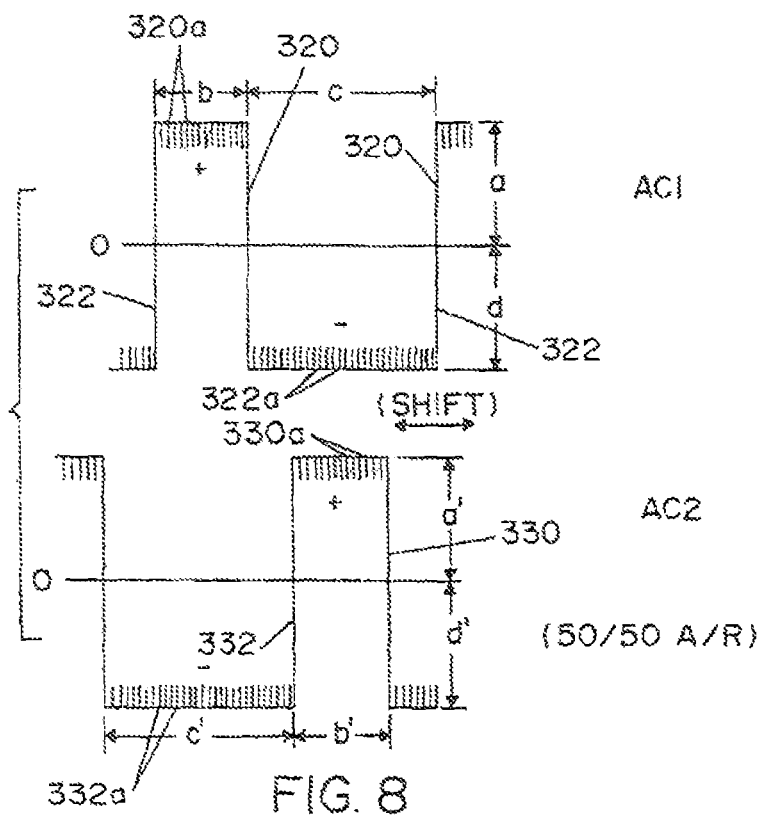
FIG. 8 is a current graph showing a broad aspect of waveforms used in an exemplary embodiment of the present invention.

In the welding system of Houston U.S. Pat. No. 6,472,634, the AC waveforms are created as shown in FIG. 6 wherein the wave shaper for arc AC1 at electrode 204 creates a signal 270 having positive portions 272 and negative portions 274. The second arc AC2 at electrode 206 is controlled by signal 280 from the wave shaper having positive portions 282 and negative portions 284. These two signals are the same, but are shifted by the signal from generator 80 a distance x, as shown in FIG. 6. The waveform technology created current pulses or waveforms at one of the arcs are waveforms having positive portions 290 and negative portions 292 shown at the bottom portion of FIG. 6. A logic bit from the wave shaper determines when the waveform is switched from the positive polarity to the negative polarity and the reverse. In accordance with the disclosure in Stava U.S. Pat. No. 6,111,216 (incorporated by reference herein) pulse width modulator 224 is generally shifted to a lower level at point 291a and 291b. Then the current reduces until reaching a fixed level, such as 100 amps. Consequently, the switches change polarity at points 294a and 294b. This produces a vertical line or shape 296a, 296b when current transitioning between positive portion 290 and negative portion 292. This is the system disclosed in the Houston patent where the like waveforms are shifted to avoid magnetic interference. The waveform portions 290, 292 are the same at arc AC1 and at arc AC2. This is different from the present invention which relates to customizing the waveforms at arc AC1 and arc AC2 for purposes of controlling the molten metal puddle and/or synthesizing a sinusoidal wave shape in a manner not heretofore employed. The disclosure of FIG. 6 is set forth to show the concept of shifting the waveforms, but not the invention which is customizing each of the adjacent waveforms. The same switching procedure to create a vertical transition between polarities is used in an exemplary embodiment of the present invention. Converting from the welding system shown in FIG. 6 to an embodiment of the present invention is generally shown in FIG. 7. The logic on line 254 is illustrated as being a logic 1 in portions 300 and a logic 0 in portions 302. The change of the logic or bit numbers signals the time when the system illustrated in FIG. 16 shifts polarity. This is schematically illustrated in the lower graph of FIG. 6 at points 294a, 294b. In accordance with aspects of the invention, wave shaper 240 for each of the adjacent AC arcs has a first wave shape 310 for one of the polarities and a second wave shape 312 for the other polarity. Each of the waveforms 310, 312 are created by the logic on line 234 taken together with the logic on line 254. Thus, pulses 310, 312 as shown in FIG. 7, are different pulses for the positive and negative polarity portions. Each of the pulses 310, 312 are created by separate and distinct current pulses 310a, 312a as shown. Switching between polarities is accomplished as illustrated in FIG. 6 where the waveforms generated by the wave shaper are shown as having the general shape of waveforms 310, 312. Positive polarity controls penetration and negative polarity controls deposition. In accordance with the invention, the positive and negative pulses of a waveform are different and the switching points are controlled so that the AC waveform at one arc is controlled both in the negative polarity and the positive polarity to have a specific shape created by the output of wave shaper 240. The waveforms for the arc adjacent to the arc having the current shown in FIG. 7 is controlled differently to obtain the advantages of the present invention. This is illustrated best in FIG. 8. The waveform at arc AC 1 is in the top part of FIG. 8. It has positive portions 320 shown by current pulses 320a and negative portions 322 formed by pulses 322a. Positive portion 320 has a maximum magnitude a and width or time period b. Negative portion 322 has a maximum magnitude d and a time or period c. These four parameters are adjusted by wave shaper 240. In the illustrated embodiment, arc AC2 has the waveform shown at the bottom of FIG. 8 where positive portion 330 is formed by current pulses 330a and has a height or magnitude a' and a time length or period b'. Negative portion 332 is formed by pulses 332a and has a maximum amplitude d' and a time length c'. These parameters are adjusted by wave shaper 240. In accordance with aspects of the invention, the waveform from the wave shaper on arc AC1 is out of phase with the wave shape for arc AC2. The two waveforms have parameters or dimensions which are adjusted so that (a) penetration and deposition is controlled and (b) there is no long time during which the puddle P is subjected to a specific polarity relationship, be it a like polarity or opposite polarity. This concept in formulating the wave shapes prevents long term polarity relationships as explained by the showings in FIGS. 9 and 10. In FIG. 9 electrodes 204, 206 have like polarity, determined by the waveforms of the adjacent currents at any given time. At that instance, magnetic flux 350 of electrode 204 and magnetic flux 352 of electrode 206 are in the same direction and cancel each other at center area 354 between the electrodes. This causes the molten metal portions 360, 362 from electrodes 204, 206 in the molten puddle P to move together, as represented by arrows c. This inward movement together or collapse of the molten metal in puddle P between electrodes 204 will ultimately cause an upward gushing action, if not terminated in a very short time, i.e. less than about 20 ms. As shown in FIG. 10, the opposite movement of the puddle occurs when the electrodes 204, 206 have opposite polarities. Then, magnetic flux 370 and magnetic flux 372 are accumulated and increased in center portion 374 between the electrodes. High forces between the electrodes causes the molten metal portions 364, 366 of puddle P to retract or be forced away from each other. This is indicated by arrows r. Such outward forcing of the molten metal in puddle P causes disruption of the weld bead if it continues for a substantial time which is generally less than 10 ms. As can be seen from FIGS. 9 and 10, it is desirable to limit the time during which the polarity of the waveform at adjacent electrodes is either the same polarity or opposite polarity. As shown in FIG. 8, like polarity and opposite polarity is retained for a very short time less than the cycle length of the waveforms at arc AC1 and arc AC2. This positive development of preventing long term occurrence of polarity relationships together with the novel concept of pulses having different shapes and different proportions in the positive and negative areas combine to control the puddle, control penetration and control deposition in a manner not heretofore obtainable in welding with a normal transformer power supplies or normal use of Lincoln waveform technology.

In FIG. 11 the positive and negative portions of the AC waveform from the wave shaper 240 are synthesized sinusoidal shapes with a different energy in the positive portion as compared to the negative portion of the waveforms. The synthesized sine wave or sinusoidal portions of the waveforms is novel. It allows the waveforms to be compatible with transformer welding circuits and compatible with evaluation of sine wave welding. In FIG. 11, waveform 370 is at arc AC1 and waveform 372 is at arc AC2. These tandem arcs utilize the AC welding current shown in FIG. 11 wherein a small positive sinusoidal portion 370a controls penetration at arc AC1 while the larger negative portion 370b controls the deposition of metal at arc AC1. There is a switching between the polarities with a change in the logic bit, as discussed in FIG. 7. Sinusoidal waveform 370 plunges vertically from approximately 100 amperes through zero current as shown in by vertical line 370c. Transition between the negative portion 370b and positive portion 370a also starts a vertical transition at the switching point causing a vertical transition 370d. In a like manner, phase shifted waveform 372 of arc AC2 has a small penetration portion 372a and a large negative deposition portion 372b. Transition between polarities is indicated by vertical lines 372c and 372d. Waveform 372 is shifted with respect to waveform 370 so that the dynamics of the puddle are controlled without excessive collapsing or repulsion of the molten metal in the puddle caused by polarities of adjacent arcs AC1, AC2. In the embodiment shown in FIG. 11, the sine wave shapes are the same and the frequencies are the same. They are merely shifted to prevent a long term occurrence of a specific polarity relationship.

Figure 12:
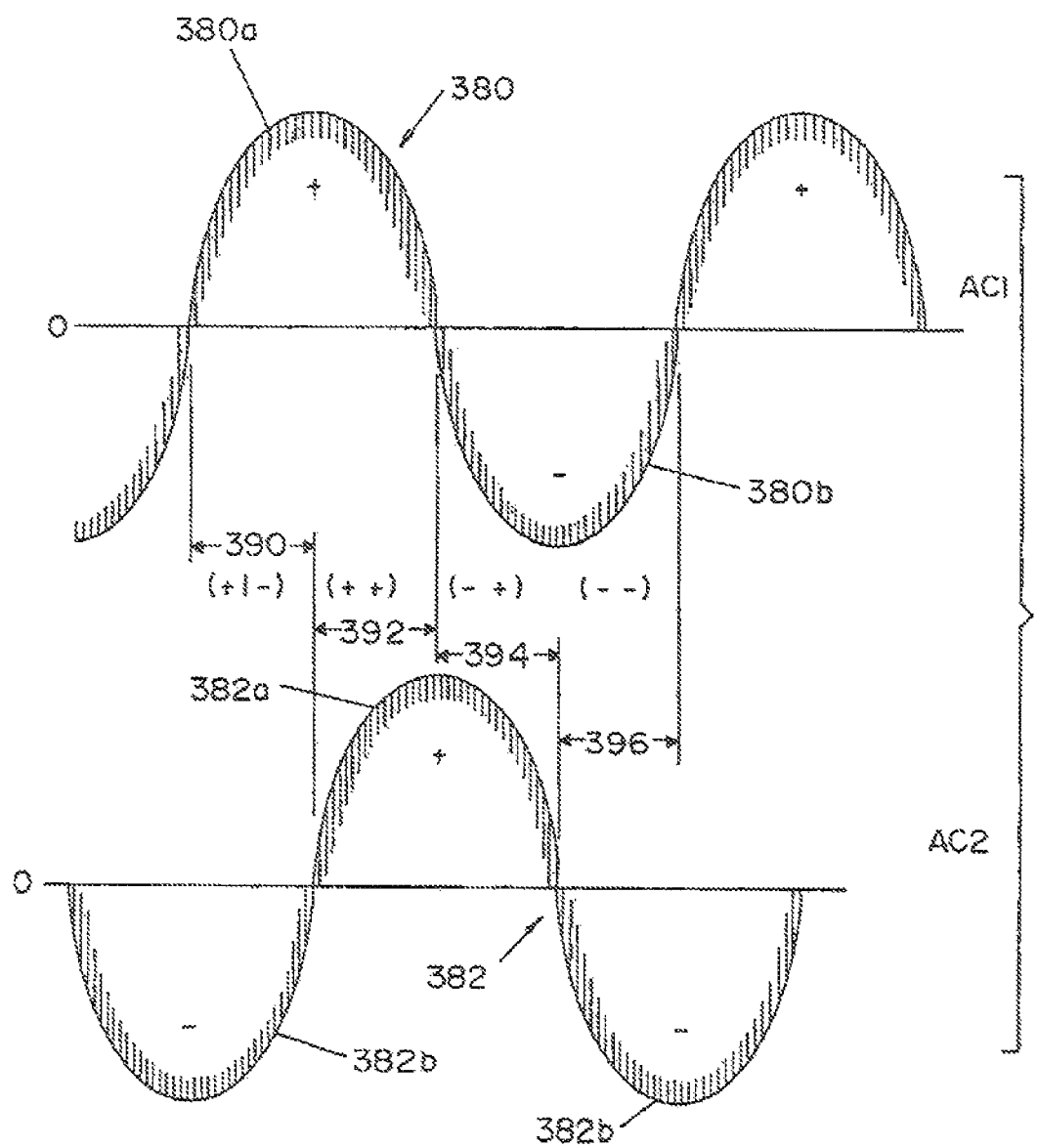
FIG. 12 is a pair of current graphs of the AC waveforms on adjacent tandem electrodes with areas of concurring polarity relationships.
Figure 13:
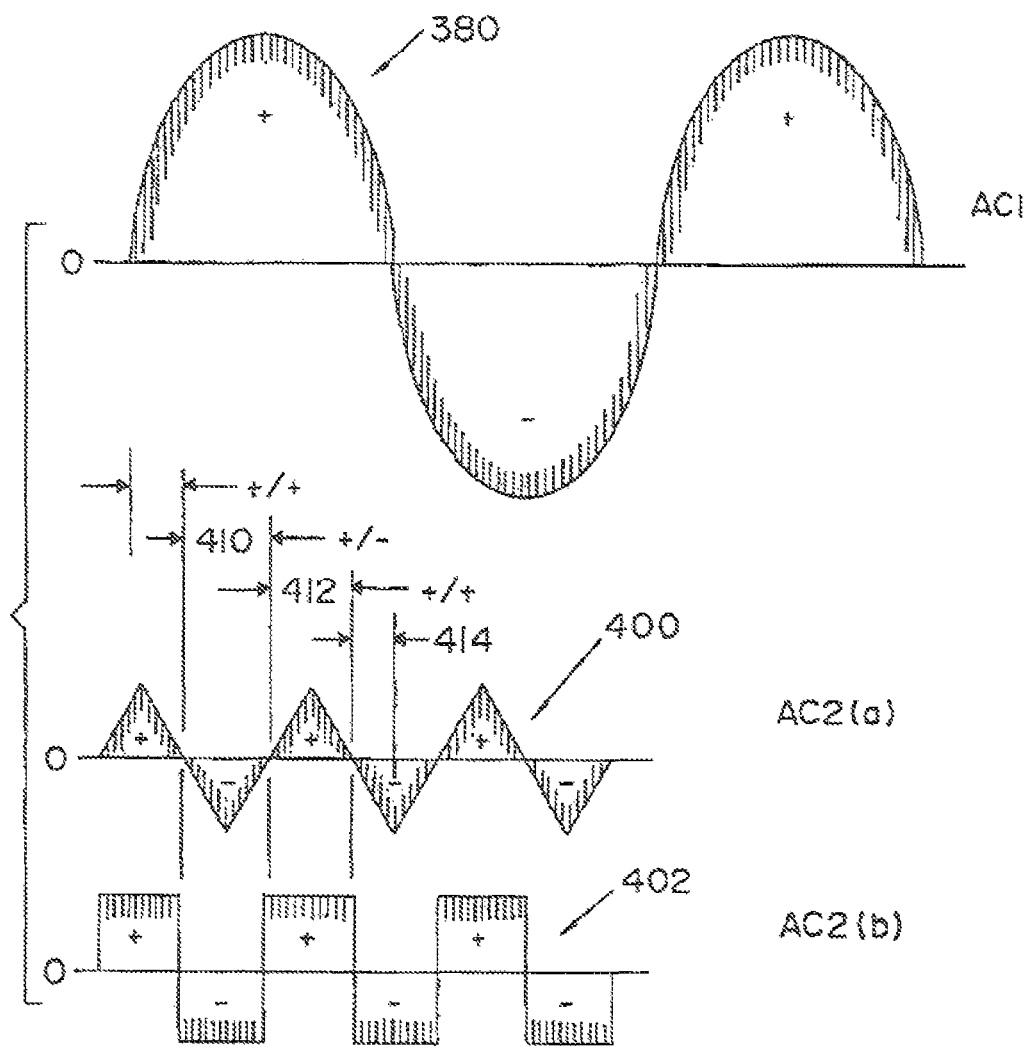
FIG. 13 are current graphs of the waveforms on adjacent tandem electrodes wherein the AC waveform of one electrode is substantially different waveform of the other electrode to limit the time of concurrent polarity relationships.
Figure 14:
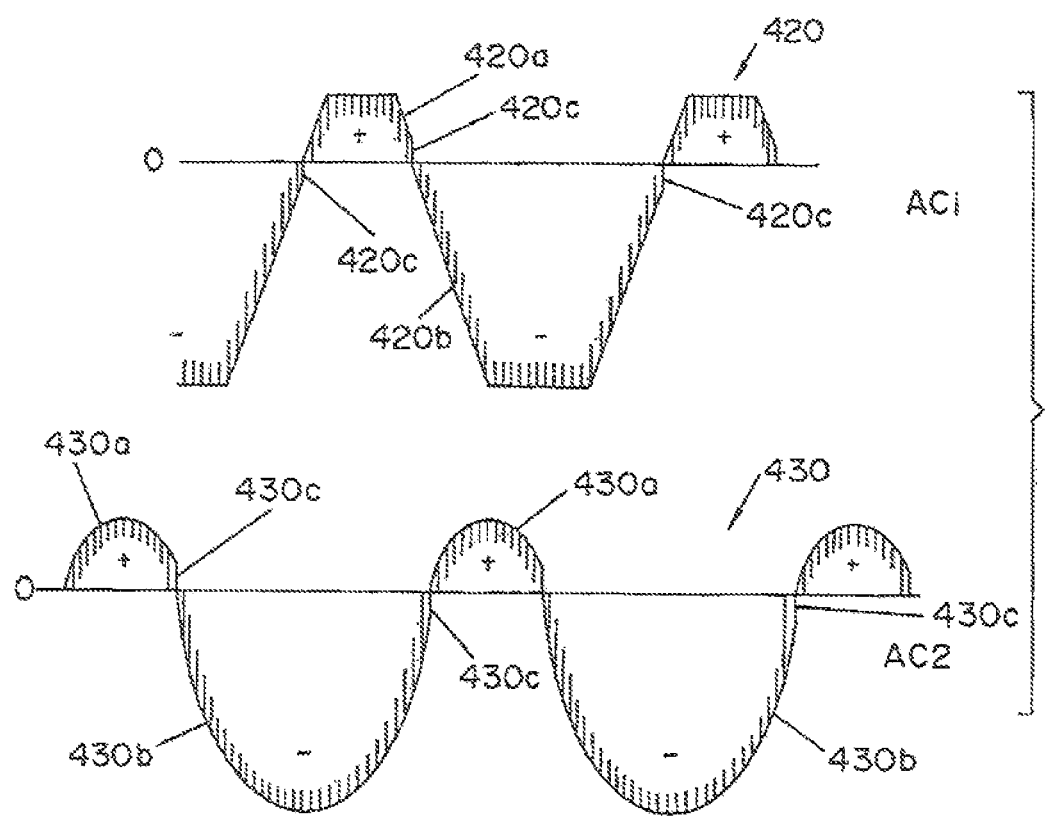
FIG. 14 are current graphs of two sinusoidal waveforms for adjacent electrodes to use different shaped wave forms for the adjacent tandem electrodes.

In FIG. 12 waveform 380 is used for arc AC1 and waveform 382 is used for arc AC2. Portions 380a, 380b, 382a, and 382b are sinusoidal synthesized and are illustrated as being of the same general magnitude. By shifting these two waveforms 900, areas of concurrent polarity are identified as areas 390, 392, 394 and 396. By using the shifted waveforms with sinusoidal profiles, like polarities or opposite polarities do not remain for any length of time. Thus, the molten metal puddle is not agitated and remains quiescent. This advantage of the concept of a difference in energy between the positive and negative polarity portions of a given waveform. FIG. 12 is illustrative in nature to show the definition of concurrent polarity relationships and the fact that they should remain for only a short period of time. To accomplish this objective, another embodiment of the present invention is illustrated in FIG. 13 wherein previously defined waveform 380 is combined with waveform 400, shown as the sawtooth waveform of arc AC2 (a) or the pulsating waveform 402 shown as the waveform for arc AC2(b). Combining waveform 380 with the different waveform 400 of a different waveform 402 produces very small areas or times of concurrent polarity relationships 410, 412, 414, etc. In FIG. 14 the AC waveform generated at one arc drastically different than the AC waveform generated at the other arc. This same concept of drastically different waveforms is illustrated in FIG. 14 wherein waveform 420 is an AC pulse profile waveform and waveform 430 is a sinusoidal profile waveform having about one-half the period of waveform 420. Waveform 420 includes a small penetration positive portion 420a and a large deposition portion 420b with straight line polarity transitions 420c. Waveform 430 includes positive portion 430a and negative portion 430b with vertical polarity transitions 430c. By having these two different waveforms, both the synthesized sinusoidal concept is employed for one electrode and there is no long term concurrent polarity relationship. Thus, the molten metal in puddle P remains somewhat quiescent during the welding operation by both arcs AC1, AC2.

Figure 15:
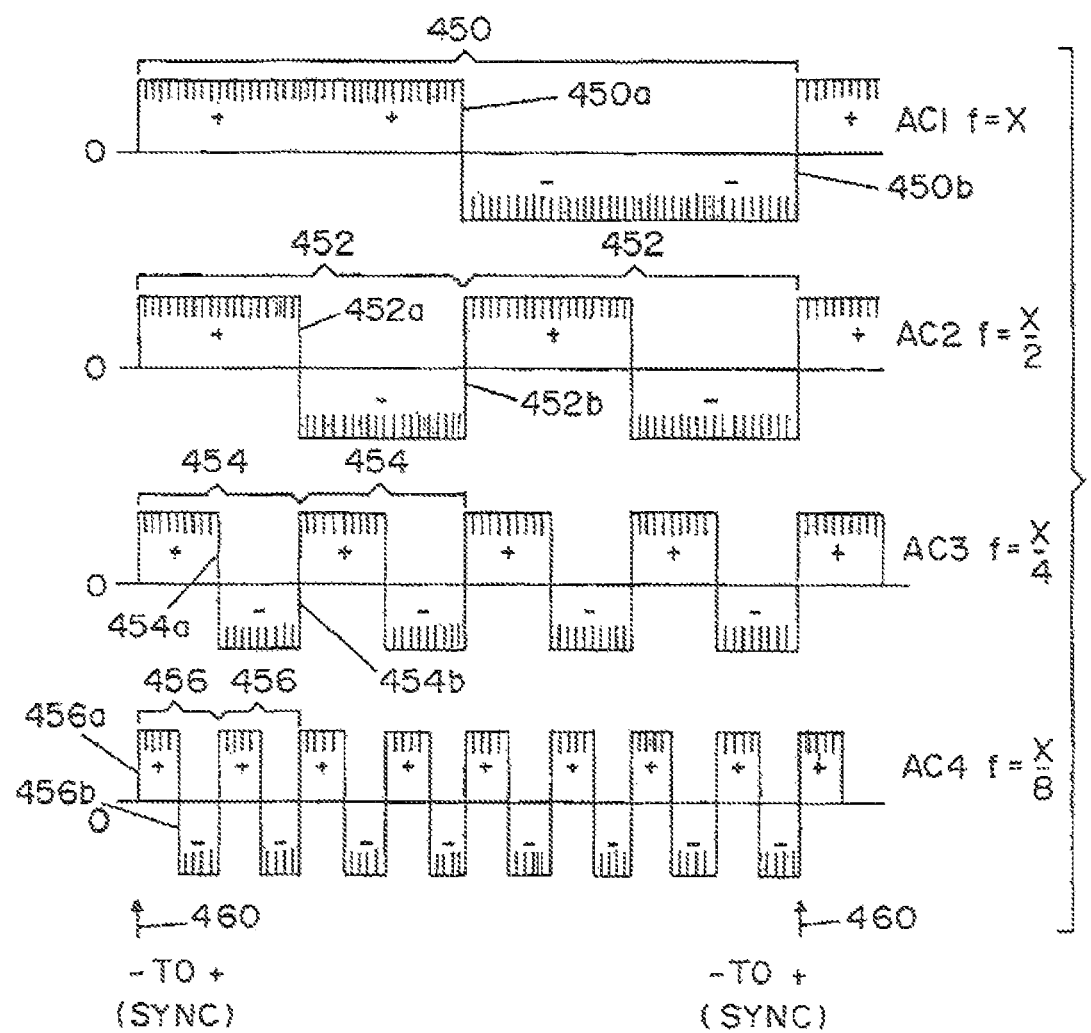
FIG. 15 are current graphs showing waveforms at four adjacent AC arcs of tandem electrodes shaped and synchronized in accordance with the welder constructed in accordance with an exemplary embodiment of the invention.

In FIG. 15 waveforms 450, 452, 454 and 456 are generated by the wave shaper 240 of the power supply for each of four tandem arcs, arc AC1, arc AC2, arc AC3 and arc AC4. The adjacent arcs are aligned as indicated by synchronization signal 460 defining when the waveforms correspond and transition from the negative portion to the positive portion. This synchronization signal is created by generator 80 shown in FIG. 1, except the start pulses are aligned. In this embodiment of the invention first waveform 450 has a positive portion 450a, which is synchronized with both the positive and negative portion of the adjacent waveform 452, 454 and 456. For instance, positive portion 450a is synchronized with and correlated to positive portion 452a and negative portion 452b of waveform 452. In a like manner, the positive portion 452a of waveform 452 is synchronized with and correlated to positive portion 454a and negative portion 454b of waveform 454. The same relationship exists between positive portion 454a and the portions 456a, 456b of waveform 456. The negative portion 450b is synchronized with and correlated to the two opposite polarity portions of aligned waveform 452. The same timing relationship exist between negative portion 452b and waveform 454. In other words, in each adjacent arc one polarity portion of the waveform is correlated to a total waveform of the adjacent arc. In this manner, the collapse and repelling forces of puddle P, as discussed in connection with FIGS. 9 and 10, are dynametically controlled. One or more of the positive or negative portions can be synthesized sinusoidal waves as discussed in connection with an aspect of the invention disclosed in FIGS. 11 and 12.

As indicated in FIGS. 1 and 2, when the master controller of switches is to switch, a switch command is issued to master controller 140a of power supply 30. This causes a "kill" signal to be received by the master so a kill signal and polarity logic is rapidly transmitted to the controller of one or more slave power supplies connected in parallel with a single electrode. If standard AC power supplies are used with large snubbers in parallel with the polarity switches, the slave controller or controllers are immediately switched within 1-10 μs after the master power supply receives the switch command. This is the advantage of the high accuracy interface cards or gateways. In practice, the actual switching for current reversal of the paralleled power supplies is not to occur until the output current is below a given value, i.e. about 100 amperes. This allows use of smaller switches.

The implementation of the switching for all power supplies for a single AC arc uses the delayed switching technique where actual switching can occur only after all power supplies are below the given low current level. The delay process is accomplished in the software of the digital processor and is illustrated by the schematic layout of FIG. 16. When the controller of master power supply 500 receives a command signal as represented by line 502, the power supply starts the switching sequence. The master outputs a logic on line 504 to provide the desired polarity for switching of the slaves to correspond with polarity switching of the master. In the commanded switch sequence, the inverter of master power supply 500 is turned off or down so current to electrode E is decreased as read by hall effect transducer 510. The switch command in line 502 causes an immediate "kill" signal as represented by line 512 to the controllers of paralleled slave power supplies 520, 522 providing current to junction 530 as measured by hall effect transducers 532, 534. All power supplies are in the switch sequence with inverters turned off or down. Software comparator circuits 550, 552, 554 compare the decreased current to a given low current referenced by the voltage on line 556. As each power supply decreases below the given value, a signal appears in lines 560, 562, and 564 to the input of a sample and hold circuits 570, 572, and 574, respectively. The circuits are outputted by a strobe signal in line 580 from each of the power supplies. When a set logic is stored in a circuit 570, 572, and 574, a YES logic appears on lines READY$^1$, READY$^2$, and READY$^3$ at the time of the strobe signal. This signal is generated in the power supplies and has a period of 25 μs; however, other high speed strobes could be used. The signals are directed to controller C of the master power supply, shown in dashed lines in FIG. 16. A software ANDing function represented by AND gate 584 has a YES logic output on line 582 when all power supplies are ready to switch polarity. This output condition is directed to clock enable terminal ECLK of software flip flop 600 having its D terminal provided with the desired logic of the polarity to be switched as appearing on line 504. An oscillator or timer operated at about 1 MHz clocks flip flop by a signal on line 602 to terminal CK. This transfers the polarity command logic on line 504 to a Q terminal 604 to provide this logic in line 610 to switch slaves 520, 522 at the same time the identical logic on line 612 switches master power supply 500. After switching, the polarity logic on line 504 shifts to the opposite polarity while master power supply awaits the next switch command based upon the switching frequency. Other circuits can be used to effect the delay in the switching sequence; however, the illustration in FIG. 16 is the present scheme.

Embodiments of the present application relate to the waveforms controlled by a wave shaper or waveform generator of an electric arc power supply including a single power source or multiple power sources correlated as disclosed in Houston U.S. Pat. No. 6,472,634 or Stava U.S. Pat. No. 6,291,798. The invention relates to tandem electrodes powered by an AC waveform. The two adjacent electrodes have waveforms that control the dynamics of the molten metal puddle between the electrodes and/or uses synthesized sine waves to correlate the operation of the tandem welding system with standard transformer welding operations. Different energy in the positive portion and negative portion controls the relationship of the amount of penetration to the amount of deposition by a particular electrode. This allows operation of adjacent electrodes in a manner to maintain the weld puddle generally quiescent. This action improves the resulting weld bead and the efficiency of the welding operation. To control the weld puddle, adjacent waveforms generated by the wave shaper have different shapes to control the length of time during which a given polarity relationship exist between the adjacent electrodes. In other words, the time that the waveforms of adjacent electrodes have like polarity or opposite polarity is limited by using different shapes and different relationships between the two adjacent AC waveforms generated by the waveform technology using a wave shaper or waveform generator.

Figure 17:
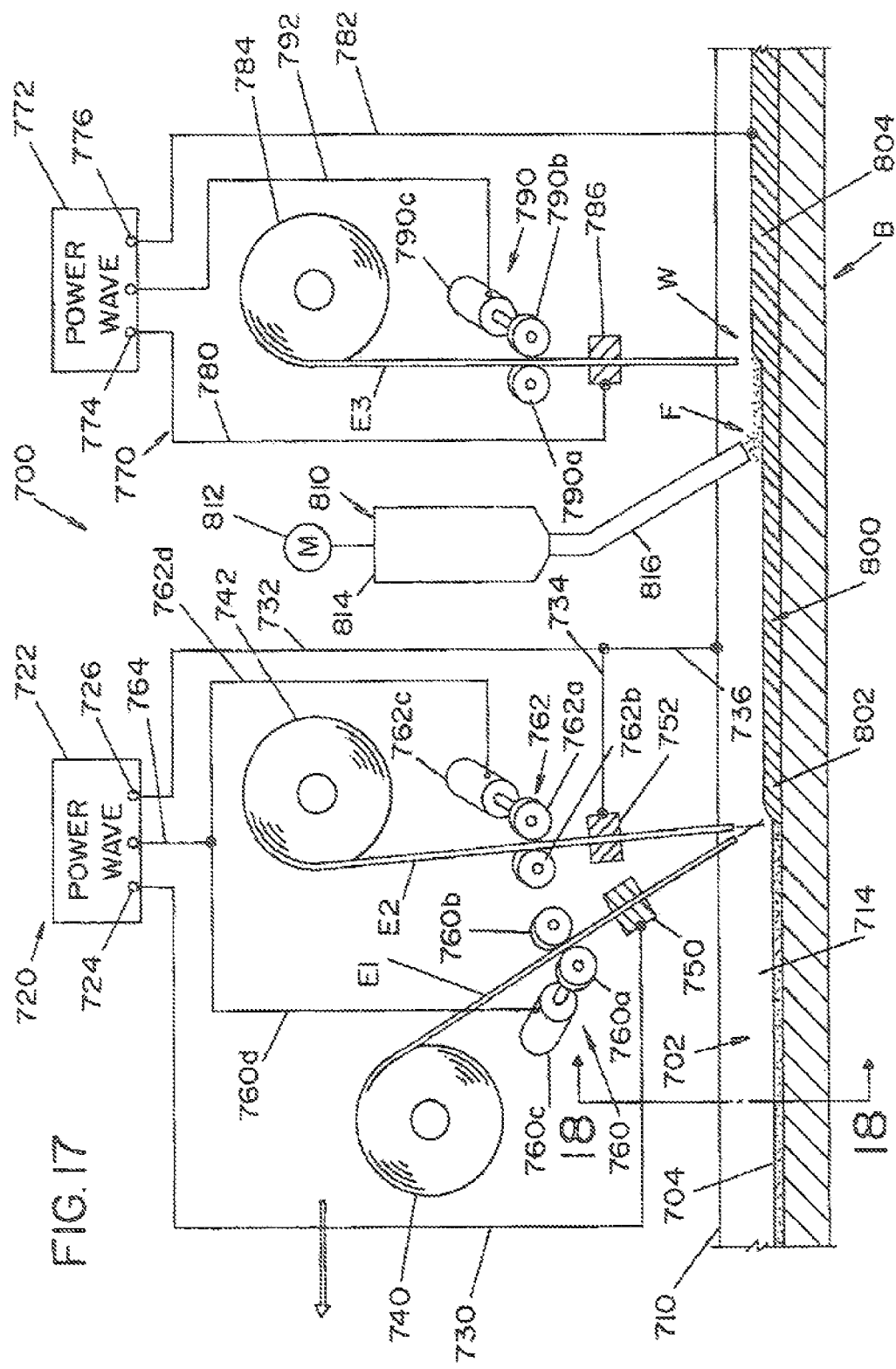
FIG. 17 is a schematic view of the general architecture of an exemplary embodiment of the present invention.

As so far described, the technology used in practicing embodiments of the present invention is explained in detail. The technology in FIGS. 1-16 is employed in an exemplary embodiment of the present invention. The exemplary embodiment of the invention involves an electric arc welder schematically illustrated in FIGS. 17 and 18 and involves tandem electric arc welding wherein first electrode E1 and second electrode E2 are connected in modified series. The subsequent electrodes, one of which is illustrated as electrode E3, are driven in unison with electrodes E1 and E2 and perform a tandem welding process. Of course, several trailing electrodes E3 are normally used. Only one trailing electrode E3 is illustrated and the same disclosure relates to the other anticipated trailing electrodes. The technology described in FIGS. 1-16 is applicable to electric arc welder 700 used to deposit metal in groove 702 of workpiece W. In the illustrated embodiment, the workpiece W is spaced plates 710, 712 with a small gap b where edges 714, 716 define trough 704 in plate B having an angle 718, best shown in FIG. 18. Electrodes E1, E2 are arranged, as shown in FIG. 17, and are directed toward a point in groove 704, best shown in FIG. 18. This point is below the electrical contact 750 and defines a stickout h. Referring now more specifically to FIG. 17, mechanism 720 drives lead electrodes E1, E2 along groove 702 and includes a main power source 722, with output terminals 724, 726 to direct AC current by way of leads 730, 732 to the respective electrodes E1, E2. The electrodes are supplied from spool 740, 742, respectively, and are driven through contacts 750, 752 by standard wire feeders 760, 762, respectively. Wire feeder 760 includes drive rolls 760a, 760b rotated by a motor 760c. In a like manner, wire feeder 762 includes drive rolls 762a, 762b rotated by motor 762c. Leads 760d and 762d are both powered by a control signal in line 764 from main power source 722. The power source is a Power Wave unit sold by The Lincoln Electric Company of Cleveland, Ohio and is generally disclosed in Blankenship U.S. Pat. No. 5,278,390. Power source 722 is used to control both wire feeders 760, 762. This results in a limitation, since a single signal is available from the power source to drive the wire feeder. When this occurs, the signal on line 764 must be a compromise signal between the desired wire feed speed of electrodes E1, E2. In practice, the single signal on line 764 drives both wire feeders. Of course, software could be developed for providing separate controls for the individual wire feeders at a substantial cost. Separate signals for the wire feeder are created when using two power sources, as shown in FIGS. 20 and 21. Lead 732 is connected to contact 752 by line 734 and to workpiece W by line 736. Thus, current flow between electrode E1 and power source 722 is through a low resistance line 734 and a higher resistance line 736. The resistance of these return paths divides the current flow to adjust the heat in the arc and penetration by the arc force in the welding process. By using the mechanism 720, high deposition by using two series electrodes is accomplished at low heat. A limited amount of current flows from electrode E1 into the workpiece during the welding operation. This welding process is controllable in accordance with the present invention, by the circuit schematically illustrated in FIG. 19.

In accordance with an exemplary embodiment of the invention, electrodes E1, E2 are trailed by at least one electrode E3, shown in FIG. 17. This trailing electrode is driven by mechanism 770 in unison with electrodes E1, E2 even though they may be moved by different mechanisms. In an exemplary embodiment, the same moving device is used for mechanisms 720, 770. The trailing electrode mechanism includes auxiliary power source 772 which is also a Power Wave unit manufactured by The Lincoln Electric Company of Cleveland, Ohio. This power source has output terminals 774, 776 for directing an AC current waveform by way of lines 780, 782 to use electrode E3 in a welding process. Electrode E3 is supplied by spool 784 and is driven through contact 786 by wire feeder 790, similar to wire feeders 760, 762. Wire feeder 790 has spaced drive rolls 790a, 790b rotated by a motor 790. A control signal from power source 772 in line 792 drives motor 790c to feed electrode E3 toward workpiece W at a speed determined by the signal in line 792.

Figure 18:
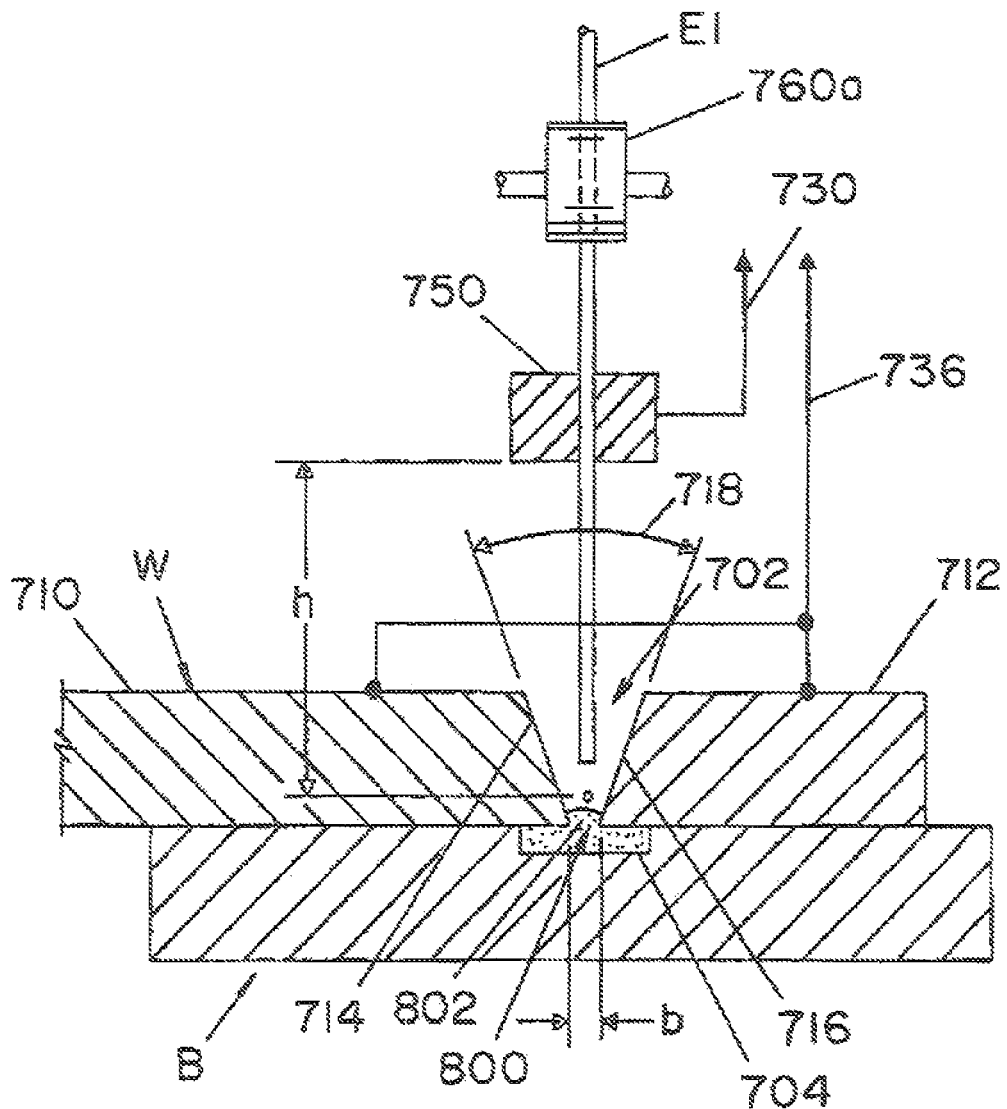
FIG. 18 is a partial cross-sectional view taken generally along line 18-18 of FIG. 17.

In operation of the exemplary embodiment illustrated in FIGS. 17 and 18, electrodes E1, E2 and trailing electrode E3 create a weld puddle 800 in groove 702. Electrodes E1, E2 create a first root pass 802, which bead joins or tacks edges 714, 716 together by melting the inwardly projecting portions of groove 702. Thereafter, puddle 800 is enlarged by overlaying bead 804 by trailing electrode E3. In practice, further electrodes are used to fill groove 702 in a tandem welding process disclosed in FIGS. 1-16. In practice, electrode E3 is used in a submerged arc welding process utilizing a flux dispenser 810 in front of electrode E3 and having a dispensing motor 812 for dispensing flux F from hopper 814 through tube 816 in accordance with standard submerged welding technology. Of course, electrode E1, E2 also are used in a submerged arc AC welding process. A similar flux dispenser 810 is then provided above groove 702 in front of electrode E1. In practice, a shielding gas has also been employed around electrodes E1, E2. Embodiments of the present invention utilize a Power Wave power source for the main power source 722 and for the auxiliary power source 772. These power sources are digitally controlled and utilize a waveform technology pioneered by The Lincoln Electric Company whereby the power sources create waveforms that comprise a series of individual current pulses created at a high switching speed in excess of 18 kHz and preferably substantially greater than 20 kHz. In practice, the waveforms are provided by a series of current pulses created at a rate of over 40 kHz. In this manner, the AC current of mechanism 720 and mechanism 770 are provided with any AC waveform to optimize the welding process for the lead electrodes as well as the trailing electrodes. This type of welding process is schematically illustrated in FIG. 19, which represents the power source used in practicing the preferred embodiment of the present invention.

Figure 19:
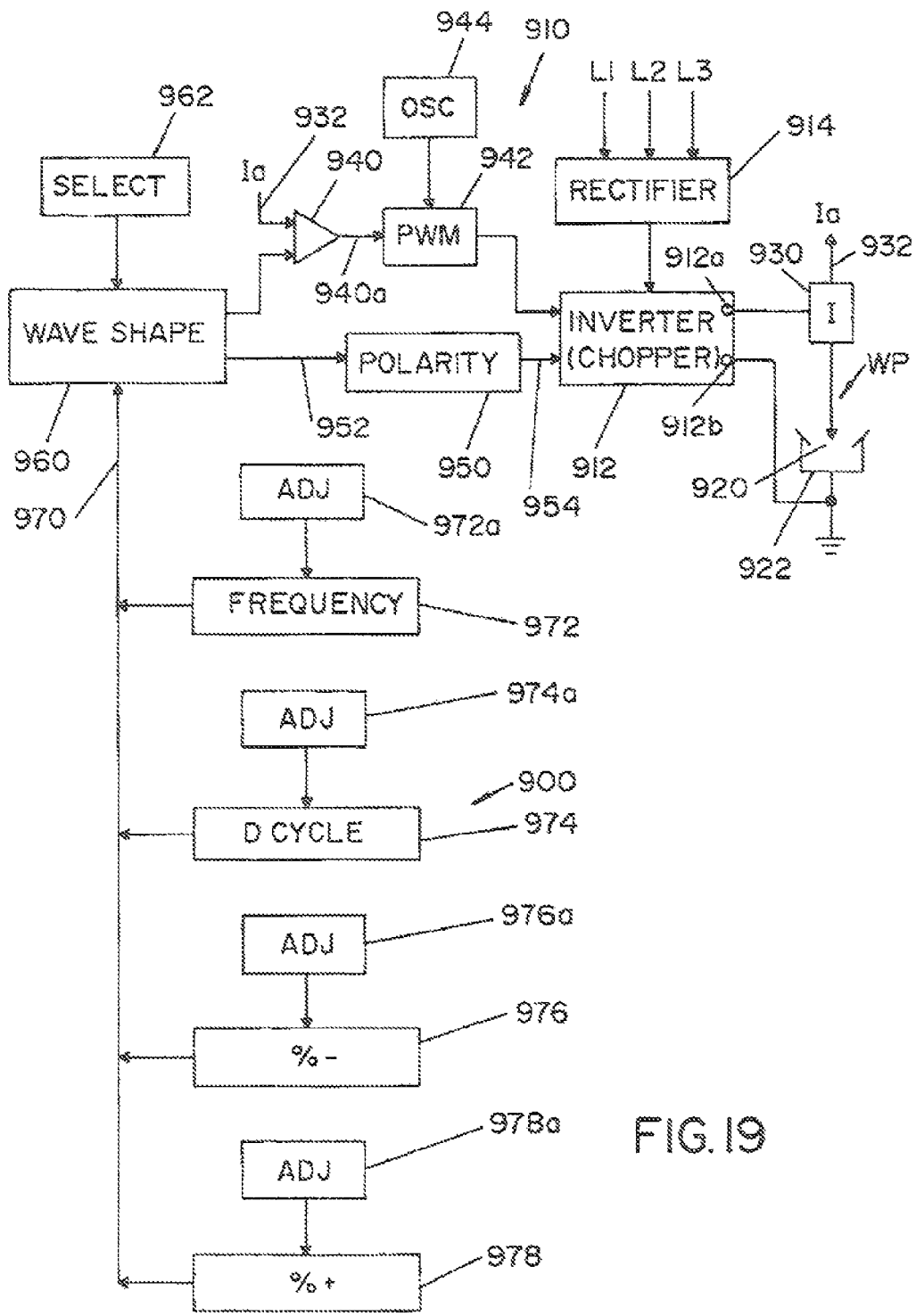
FIG. 19 is a schematic layout of the software program, together with a block diagram schematically illustrating the operation of the main power source used in an exemplary embodiment of the present invention.

System 900 of the present invention is schematically illustrated in FIG. 19 wherein a Power Wave power source 910 has a high switching output stage 912 with an input rectifier 914 for receiving three phase line current L1, L2, and L3, and output terminals 912a and 912b. Output stage 912 creates an AC waveform at output terminals 912a, 9112b to perform an AC arc welding process at weld station WP illustrated as including electrode 920 and workpiece 922 and having a current shunt 930 to output a signal in line 932. This signal represents the current of the welding process being performed at weld station WP. Comparator 940 receives the signal on line 932 and has an output 940a with a voltage controlling pulse width modulator circuit 942, which can be digital or analog and has a variety of configurations. The pulse width modulator is driven at high speed by oscillator 944 which, in practice, operates at a frequency of about 40 kHz. This frequency of the oscillator driving the pulse width modulator and provides a series of current pulses at a high speed switching rate to create an AC waveform at station WP. The polarity of the waveform is controlled by the logic or signal from network 950 having an input line 952 from waveform generator 960 and an output line 954 for controlling the polarity of the waveform outputted from stage 912 of the Power Wave power source unit. The profile of the waveform comprising a series of rapidly created pulses is controlled and dictated by waveform generator 960 having a select network 962 which selects the desired waveform to be created at output terminals 912a, 912b of stage 912. By the selected waveform from network 962, the desired waveform is created for use by the electric arc welding mechanisms 720 and 770. In accordance with the invention, the waveform between electrodes E1, E2 is adjusted as shown in system 900. The waveform of the trailing electrode, illustrated as electrode E3, is controlled by the circuits illustrated and discussed with respect to FIGS. 1-16. To control the waveform used for the series connected electrodes E1, E2, system 900 includes waveform adjusting circuits 972-978, each having adjusting networks 972a-978a. Circuit 972 adjusts the frequency of the waveform. After the waveform is selected by network 962, a signal from circuit 972 adjusts the frequency of the AC waveform. In a like manner, the duty cycle of the waveform is controlled by circuit 974. Duty cycle is the relative time the waveform is in the positive polarity compared to the time in the negative polarity. Circuits 976 and 978 control the magnitude of the current during the negative portion of the waveform or the positive portion of the waveform. Circuit 976 is to adjust the magnitude of the negative portion of the waveform. Circuit 978 adjusts the magnitude of the positive portion of the waveform. The waveform used for electrodes E1, E2 is an AC waveform. However, a DC waveform could be used for a trailing electrode E3, although AC current is preferred in some embodiments. Indeed, for some embodiments it is preferred to use an AC waveform for all electrodes of electric arc welder 700. Other circuits have been used to adjust the signal on line 970 to modulate and change the profile of the wave shape selected by network 962 to optimize welding at the intersection of electrodes E1, E2.

To increase the amount of current available for the welder shown in FIG. 17 using the system shown in FIG. 19, a modified electric arc welder 980 is shown in FIG. 20. Only the leading series connected electrodes E1, E2 are illustrated; however, trailing electrodes E3 would be employed in welder 980. The welder is used to obtain more welding current by forming main power source 722 into a modified power source 722a including two separate Power Wave units 982, 984. These units are connected in parallel to double the current capacity. Output leads 982a, 982b are connected to terminals 724, 726, respectively. Output leads 984a, 984b are also connected to terminals 724, 726, respectively. Thus, welder 980 operates as welder 700 shown in FIGS. 17 and 18 by using system 900 shown in FIG. 19. By using parallel power sources, the available current is increased, without increasing the capacity of the individual power source. Furthermore, modules 982, 984 generate their own wire feeder control signals in lines 982c, 984c, respectively. Thus, wire feeders 760, 762 are controlled by separately adjustable signals available in each of the two power sources 982 and 984. Thus, the individual wire feed speed of electrodes E1, E2 are adjusted using welder 980. A similar modification of the preferred embodiment illustrated in FIGS. 17-19 is schematically illustrated in FIG. 21 which shows tandem electrode welder 990 including a main power source 992 and a second power source 994. The main power source 992 has output terminals 996a and 996b. These terminals are connected to leads 992a and 992b, respectively. Lead 992a connects the one output of power source 992 to contact 750 of electrode E1. Line 992b is connected to line 1000 for current flow in a path to and from contact E2. To connect terminal 996b in the path of the workpiece ground, second power source 994 is connected in series between terminal 996b and workpiece W. Power source 994 has terminals 998a, 998b. In this manner, second power source 994 is in series with the lead 994b connected to terminal 998b. In this architecture, electrode E1 carries full current and the current to and from electrode E1 is divided between electrode E2 and lead 994b. This is like the architecture of FIG. 16. However, lead 994a from terminal 998a is connected to lead 992b from power source 992. Consequently, the two power sources 992 and 994 are connected in series between the ground 994b and lead 992a. Between the two power sources, lead 1000 is connected to contact 752 of electrode E2. Consequently, electrodes E1 and E2 are in series with a ground current path through Power Wave power source 994. By using this arrangement, the waveforms used for both power source 992 and 994 are the same and are each created by a system 900 as shown in FIG. 19. Adjustments are made to the waveform process by power source 994 to control the current flowing in the ground path of the welder shown in FIG. 21. Since two separate power sources are employed, wire feeder 760 is controlled by the signal on line 992c from power source 992. A second wire feeder signal in line 994c is controlled by power source 994. As discussed with respect to the welder shown in FIG. 20, welder 990 has the advantage of being able to control wire feeders 760, 762 separately without complex software in the power source digital control section. In essence, FIG. 20 shows a main power source with two parallel modules. In FIG. 21 series connected modules are used; however, the second module is connected in series with the ground line to better control the current waveform in the ground return circuit or path.

The various technology concepts in FIGS. 1-16 can be applied to the welder shown in FIGS. 16-21 and the various concepts in these latter mentioned welders can be incorporated into each other to accomplish the objective of a tandem arc welder wherein the front two electrodes are connected in series and having a current return path through the workpiece.

Figure 22:
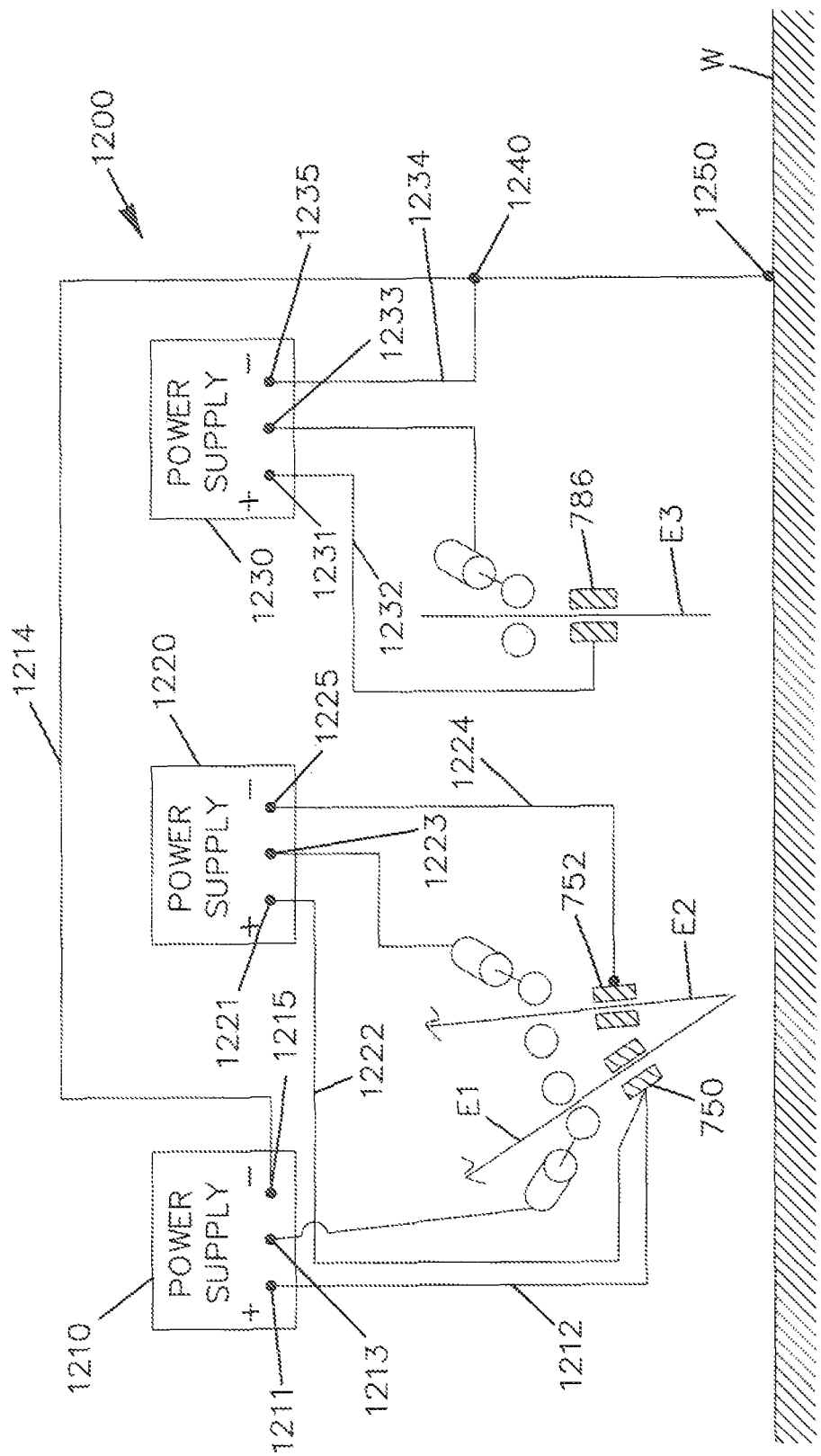
FIG. 22 is a schematic view of another exemplary embodiment of the present invention.

FIG. 22 depicts a further exemplary embodiment of the present invention. Specifically, a welding system 1200 is shown for modified series arc welding. The welding system 1200 contains at least three power supplies 1210, 1220 and 1230 which are capable of welding for a submerged arc welding process. The power supplies can be of the type described previously. In another exemplary embodiment of the present invention, the power supplies can be of a type similar to the Power Wave AC/DC 1000 SD, manufactured by The Lincoln Electric Company of Cleveland Ohio. Of course, other types of power supplies can be utilized. Each of the power supplies have positive output terminals 1211, 1221, and 1231 (respectively), and negative output terminals 1215, 1225 and 1235 (respectively), which are used to output the positive and negative portions of the welding signal to the workpiece W, via positive and negative leads. In embodiments of the present invention, the connection of the leads is different than that done in the past. This is described more fully below, and this connection and control profile can provide improvements over other series arc and modified series arc welding systems.

As described previously, for example with respect to FIG. 17, three electrodes E1, E2, and E3 can be used in embodiments of the invention. It is noted that aspects of the present invention are not limited to the use of having only three electrodes. For example, additional electrodes (coupled to additional power supplies) can follow the trailing electrode E3. Furthermore, in other exemplary embodiments of the present invention, it is not necessary to have the trailing electrode E3 (and power supply 1230), which is typically used to provide additional filler material into the weld.

In exemplary embodiments of the present invention, the positive leads 1212/1222 of both the first and second power supplies 1210/1220 are electrically connected to the leading contact 750, such that each of the first and second power supplies 1212/1222 deliver their respective welding signals to the same contact, and in the embodiment shown—the leading contact 750. In the embodiment shown in FIG. 22, the positive lead 1232 for the third power supply 1230 couples the power supply 1230 to the trailing contact 786. The negative lead 1214 of the first power supply 1210 is coupled to the workpiece W. Such a connection type is known and can be accomplished via a ground clamp, etc. Similarly, the negative lead 1234 is also coupled to the workpiece W via a ground clamp, etc. In the exemplary embodiment shown the negative leads 1214/1234 from both the first and third power supplies 1210/1230 are connected at a common bus point 1240, and the bus point 1240 is coupled to the workpiece W at a ground point 1250. Such a configuration can be utilized when the power supplies are located remotely from the workpiece W such that it is difficult to easily connect the respective leads 1214 and 1234 to the workpiece. The bus point 1240 can be made of any conductive type material or configuration, and for example can be simply a copper bar or plate. It is also noted that it is not necessary for the leads 1214 and 1234 to be grounded at the same point 1250, however such a configuration may be advantageous depending on the configuration and setup of the welding process.

It should be noted that although the power supplies 1210/1220/1230 are shown as separated components in FIG. 22, embodiments of the present invention are not limited in this regard. Specifically, embodiment of the present invention can have multiple power supply circuits integrated into a single unit or housing. It is not required that each power supply described herein be a entirely separate, individual power supply.

The negative lead 1224 of the second power supply 1220 is coupled to the second contact 752. The second power supply 1220 does not have a ground or negative lead which is directly connected to the workpiece W. This is contrary to known systems. In such a configuration, at least some of the welding current from the first and second power supplies 1210/1220 passes from the lead contact 750 into the second contact 752 and back into the second power supply 1220. It should be understood that during welding electrical current passes between the electrode E1 and the workpiece W and between the electrode E1 and E2. That is, there are two current returns paths—through the workpiece and ground point 1250 and through the negative lead 1224. Because of this, although a common arc is created with the electrodes E1 and E2, this common arc is effectively made up by an arc between the electrode E1 and the workpiece and the electrode E1 and the electrode E2. Thus, there is no physical or real electrical connection between the terminal 1225 on the second power supply 1220 and the workpiece W.

As explained previously, the first and second electrodes E1 and E2 share a common welding arc. As such, during welding at least some of the welding current passes from the first electrode E1 to the second electrode E2 and back into the second power supply 1220 via the negative lead 1224.

In such a configuration, issues related to the impedance of the overall system are mitigated, if not eliminated all together. In prior systems, the ground path for the electrical current can significantly affect the responsiveness of the welding system. That is, the overall impedance of the system is significantly affected by the ground path because the ground path is a variable which can be difficult to control. For example, as the welding operation proceeds the distance between the arc and the ground point 1250 can change. This change in distance changes the resistance of the circuit (between the arcs and the ground point 1250) and as such the impedance of the overall electrical circuit was unpredictable and would change during the welding operation. Moreover, the initial setup of the ground connection 1250 was also critical, as the ground point 1250 location must have been carefully selected to provide optimal system performance. However, again, even if the ground point 1250 was carefully selected as the welding process was ongoing the distance to the ground point 1250 would change, thus again changing the impedance of the system. It is known that the impedance of the electrical system can greatly affect the overall responsiveness of the welding power supplies, because the current flow is significantly affected by the impedance of the electrical circuit. In these prior systems, the instability caused problems with the creation of the back bead (that is the bead created at the bottom of the workpiece with the first root pass 802). This is because the common arc between electrodes E1 and E2 was unstable, as the current control from the power supplies was adversely affected by the impedance changes. Furthermore, the instability of the electrical circuits also adversely affected the arc stability of the trailing electrode E3. This instability would lead to poor weld quality and poor weld bead shape.

By having the negative lead 1224 of the second power supply 1220 only connected to the contact 752 and not to the workpiece W, the above discussed impedance issues are mitigated. This allows the second power supply 1220 to be able to be more responsive in controlling its current output and thus provide a more stable welding arc and welding system.

To aid in understanding the above discussed embodiment, the operation of an exemplary embodiment will now be discussed. In the embodiment shown in FIG. 22, the lead power supply 1210 is the master power supply, while the second power supply 1220 is the slave power supply, which receives its operational commands from the master power supply 1210. Master/slave operational setups are well known in the welding industry and will not be discussed in detail herein.

For operation a "total current" and "ground current" setting is communicated to and/or set on the master power supply 1210. The total current is the total amount of current (RMS current) delivered by both the master 1210 and slave 1220 power supplies through their respective positive leads 1212/1222 to the contact 750. The ground current is the amount of the total current that is to be delivered to the workpiece W—that is, travel through the ground path. The difference between the total and the ground current is then delivered to the slave power supply 1220 through the negative lead 1224. Because of such a current path the slave power supply 1220 can precisely control its current and as such precisely control the total current and the ground current. The slave power supply's operation is not adversely affected by changing impedance during welding, or imprecisely initially determined impedance.

Because the ground current is the current going into the workpiece W it is the ground current which is determining the overall heat input into the weld. As such, the heat input into the weld can be precisely controlled and optimized for a given welding operation. This optimization can be accomplished by adjusting the relationship and/or difference between the total current and the ground current. That is, the ground current can be reduced while the total current is maintained. Thus, the total deposition rate of the welding process can be unaffected (because the total current is maintained), while the total heat input is reduced (with the reduction of the amount of ground current being supplied to the weld). Alternatively, the deposition rate of the welding process can be increased without increasing the overall heat input into the weld. The total current utilized will dictate the overall deposition rate that can be achieved. Typically, the higher the total current the higher the deposition rate. However, in prior systems the increase in total current also meant an increase in heat input—which can be disadvantageous, especially when welding thin workpieces W. Embodiments of the present invention allow for a welding process to have an increased deposition rate with no change in overall heat input. For example, an embodiment having a total current of 1,200 amps with a ground current of 700 amps will have a higher deposition rate than a process having a total current of 1,000 amps and a ground current of 700 amps, while the heat input into the workpiece W remains practically the same in both applications.

In exemplary embodiments of the present invention, the current levels (in RMS current) of the first 1210 and second 1220 power supplies are not the same. Specifically, in exemplary embodiments of the present invention, the lead power supply 1210 provides a higher RMS current to the welding operation than the second power supply 1220. Stated differently, in embodiments of the present invention, the ground current will always be greater than 50% of the total current supplied. For example, if a total of 1,000 amps is desired for a welding operation and the desired ground current is to be 600 amps, the leading power supply 1210 will provide a total of 600 amps, while the second power supply 1220 will provide the remaining 400 amps. In such a configuration the leading power supply 1210 will be the master power supply while the second power supply 1220 will be the slave power supply. As such, based on the user settings (discussed further below), the master power supply 1210 sets itself to provide the ground current, and instructs the slave power supply 1220 to provide the remaining difference between the desired total current and the ground current. (400 amps in the example above.)

In exemplary embodiments of the present invention, the difference in current supplied by the master and slave power supplies 1210/1220 is in the range of 50 to 600 amps. In further exemplary embodiments of the present invention, the different in current supplied is in the range of 100 to 500 amps. By having a larger differential it is possible to use a slave power supply that will not have the same power rating as the master power supply. This may help in reducing operational costs as a smaller power supply can be utilized for the slave power supply.

During operation, an operator would set both the desired total current and desired ground current, and control circuitry within the master supply 1210 would cause both the master and slave power supplies 1210/1220 to be set to their respective settings. In this configuration, each of the master and slave power supplies 1210/1220 are individually responsible for delivering their respective currents to the weld. In such a configuration, the overall control of the total and ground current is optimized. Thus, the current in the series arc is no longer dictated by the varying impedance in the circuit (for example, because of the presence of the workpiece) but rather is directly controlled by the slave power supply 1220.

In embodiments of the present invention, the welding signals provided by the master and slave power supplies are constant voltage signals. In further exemplary embodiments, the signals are constant current signals. Ideally, the power supplies 1210 and 1220 can be capable of providing both types of welding signals based on the weld parameters.

Figure 23:
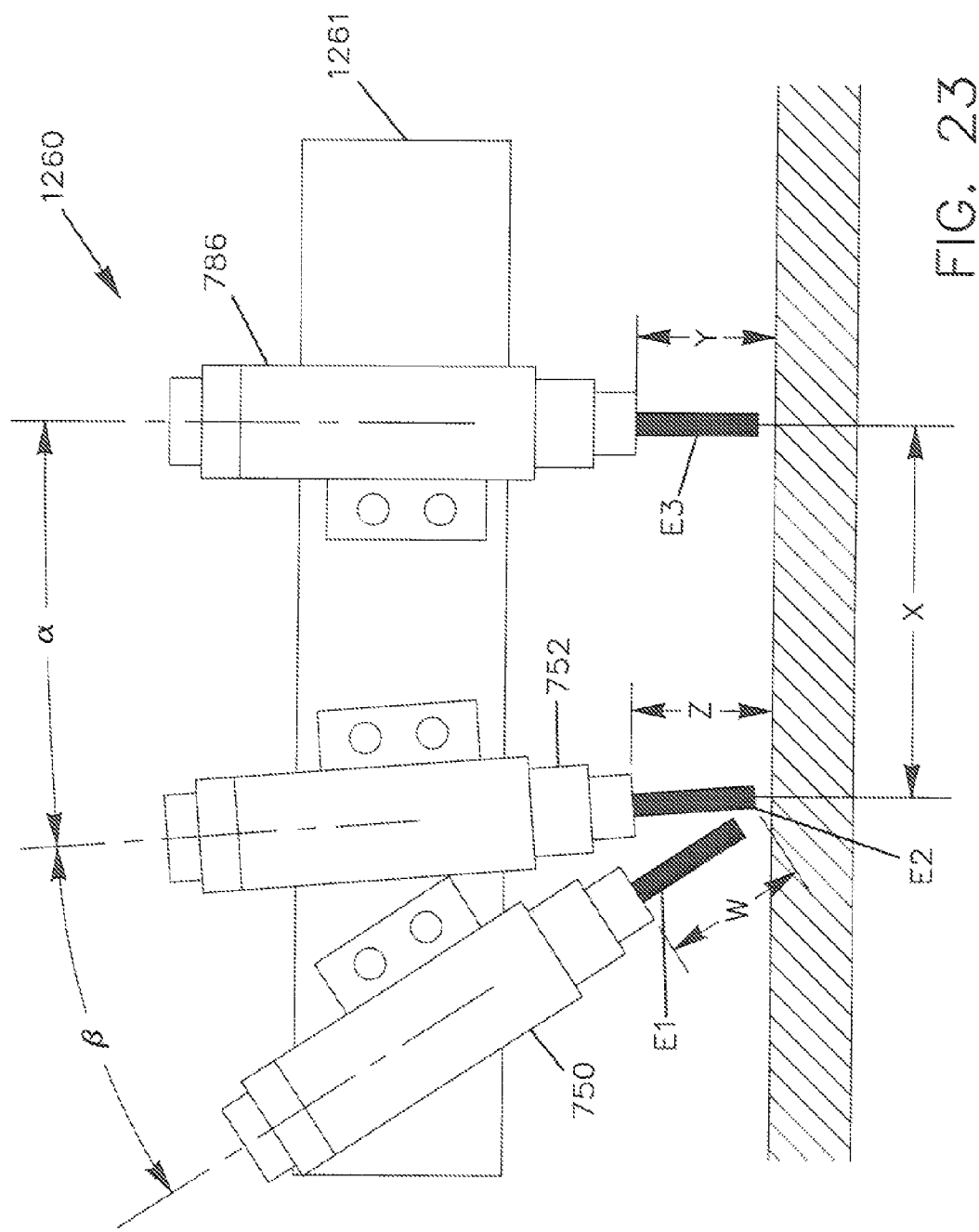
FIG. 23 is a schematic view of a carriage assembly of welding contacts in accordance with an embodiment of the present invention.

FIG. 23 is a pictorial representation of an exemplary embodiment of a welding carriage assembly 1260 that can be utilized with embodiments of the systems described herein. The assembly 1260 contains a support 1261 which secures each of the contacts 750, 752 and 786 relative to each other during the welding operation. In the embodiment shown the contact 786 is oriented normal to the welding surface and provides a stick out length Y for the electrode E3. The stick out length Y can be any length which provides a suitable welding operation, and can be in the range of 0.75 to 2.5 inches. The series contacts 750 and 752 are positioned adjacent to each other and are angled with respect to each other. The angle β between the centerline of the contacts 750 and 752 can be in the range of 15 to 45 degrees, and in some exemplary embodiments can be in the range of 25 to 35 degrees. Further, in the embodiment shown the contact 752 is angled with respect to trailing contact 786 by the angle α. In exemplary embodiments of the present invention, the angle α is in the range of 0 to 15 degrees. Each of the contacts 750 and 752 are oriented and positioned such that their respective electrodes E1 and E2 intersect at a distance of approximately 0.25 inches above the bottom surface of the workpiece W during welding. In other exemplary embodiments, such as when welding thinner workpieces, the intersection point is above the upper surface of the workpiece. The intersection of the electrodes should be chosen to optimize the welding operation, based on at least the thicknesses of the workpiece(s) being welded. Further, each of the contacts 750 and 752 provide stick out distances W and Z, respectively, which are in the range of 0.75 to 2.5 inches. In exemplary embodiments of the present invention the stick out distances W and Z are the same, but in other embodiments the stick out distances can be different.

Further, in the exemplary embodiment shown in FIG. 23 the contact 752 and the trailing contact 786 are positioned on the support 1261 such that a distance X is measured between the respective electrodes E2 and E3. The distance X is selected so that the deposition from the electrode E3 can be suitably deposited onto the weld created by the electrodes E1 and E2. If X is too large, the deposition of the electrode E3 could interfere with slag created by the welding with E1 and E2. The slag is created by the use of flux, which is known by those in the industry. However, if the distance X is too small, then the respective welding arcs could interfere with other, or cause too much overall heat input into weld zone. In exemplary embodiments of the present invention the distance X is in the range of 3 to 6 inches. In other exemplary embodiments the distance x is in the range of 4 to 5 inches.

The electrodes E1, E2 and E3 are to be selected based on desired welding performance (e.g., deposition rates, etc.) and weld characteristics (e.g., strength, etc.). As such, in some embodiments of the invention, the diameters of the electrodes E1, E2 and E3 can be different. For example, E1 can have a 3/16 inch diameter, while E2 has a 1/8 inch diameter and E3 has a 5/32 inch diameter. Of course, other diameters can be selected based on desired performance. Similarly, the composition of the electrodes can be different based on desired weld chemistry. For example, E1 and E2 can have the same chemistry, while E3 has a different chemistry. Embodiments of the present invention are not limited in this regard, as various chemistry combinations can be employed as desired.

Further, during operation the wire feed speeds for each of the respective electrodes E1, E2 and E3 do not have to be the same. Thus, during welding it is contemplated that the electrodes E1, E2 and E3 are fed into the weld at differing wire feed speeds, as desired for the needed relative deposition rates. In the embodiment shown in FIG. 22, each of the separate wire feeders for the electrodes E1, E2, and E3 are coupled to the power sources through the respective wire feed signal posts 1213, 1223, and 1233. In such an embodiment, each of the power supplies control the operation of the wire feeders, and as such the wire feed speeds can be different for each wire E1, E2 and E3. However, in another exemplary embodiment of the present invention, the wire feeders for each of the series wires E1 and E2 can be coupled to the post 1213 of the master power supply 1210 such that they each receive the same signal. In such an embodiment, the wire feed speeds for the series wires E1 and E2 would be the same as each wire feeder is receiving the same control signal. An example of such a configuration can be seen in FIG. 17 where the lead 764 is coupled to both wire feeders 760 and 762.

Figure 24:
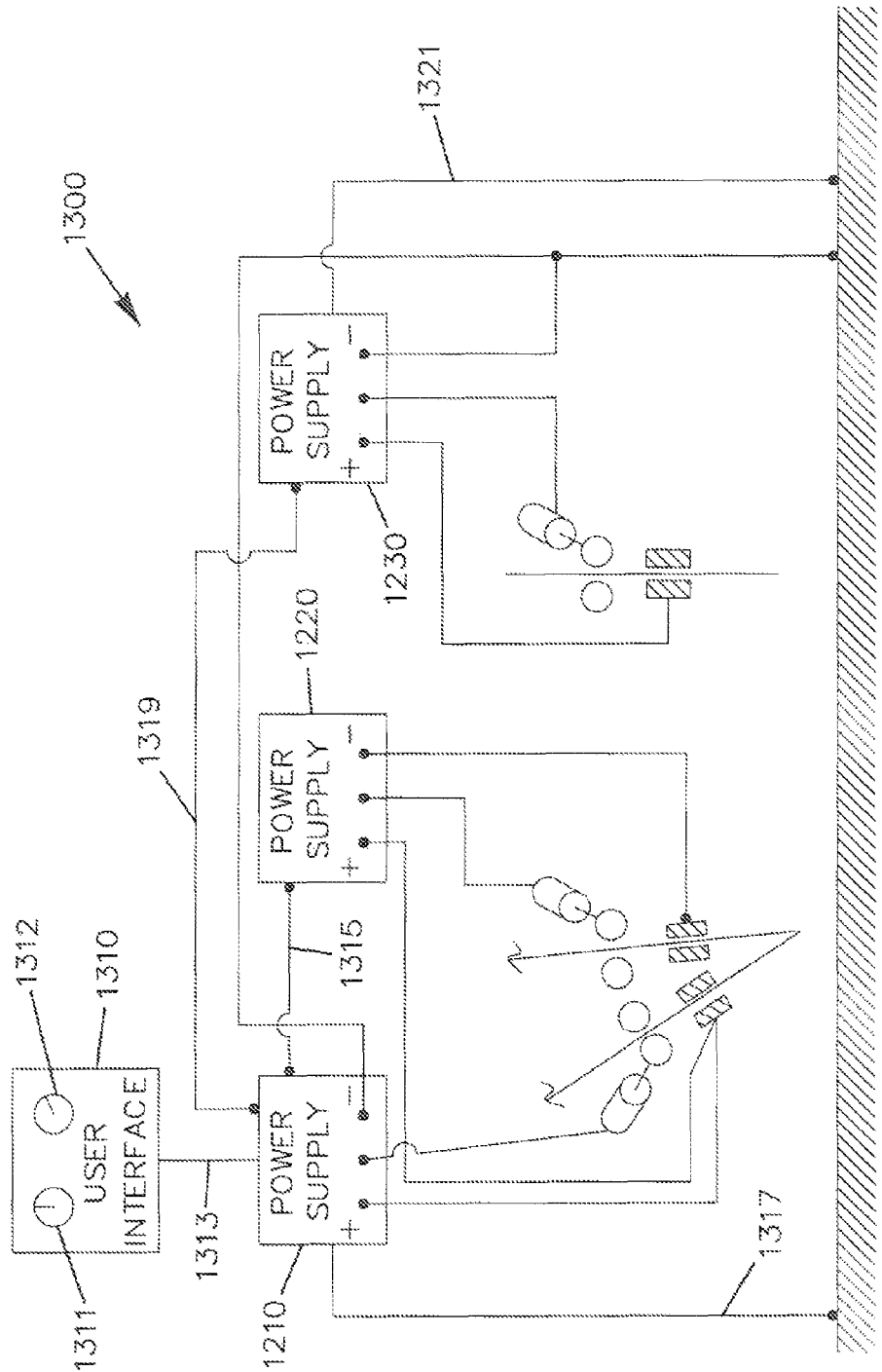
FIG. 24 is another schematic view of an exemplary embodiment of the present invention.

FIG. 24 shows another exemplary embodiment of the present invention. Specifically, a welding system 1300 is shown which is similar in construction to that shown in FIG. 22. (Accordingly, like reference numbers are not repeated for figure clarity.) A user interface 1310 is provided having an input for total current 1311 and ground current 1312. The user interface 1310 is coupled to at least the master power supply 1210 via connection 1313 to communicate the settings to the power supply 1210 for welding. Although the user interface 1310 is shown as a separate component in FIG. 24, embodiments of the present invention are not limited to this configuration. Specifically, the user interface 1310 with inputs 1311 and 1312 can be made integral to a power supply, for example the master power supply 1210. Embodiments of the present invention are not limited in this regard. The user interface 1310 can be any known or type of system or device which allows for the input of user set points or data, such as a PC based device, etc. Embodiments of the present invention are not limited in this regard.

During operation, the master power supply 1210 receives the input total and ground current settings and then sets its output current setting to match the ground current setting. The master power supply 1210 is coupled to the slave power supply 1220 such that the slave power supply 1220 sets its own current output to the difference between the total current and the ground current. Thus the combined output of the master and slave power supplies 1210 and 1220 will be the desired total current. The master power supply 1210 can either communicate the desired set point to the slave power supply (that is, the difference between the total and ground currents) or can simply communicate the total and ground current settings so that the slave power supply will determine its own set point.

Of course, other configurations can be utilized. For example, the user interface 1310 can be coupled to both the master and slave power supplies 1210/1220 and communicate the setting information to each so that they may set the appropriate operational set points for the power supplies. Either the set points can be communicated to the master and slave power supplies or each of the respective power supplies 1210/1220 can determine and set their own respective set points. The user interface 1310 can also be only coupled to the slave power supply 1220 which then communicates the set point(s) to the master supply 1210, which then controls aspects of the welding operation.

In the exemplary embodiment shown in FIG. 24 a link 1319 exists between the master power supply 1210 and the third power supply 1230. This link allows the powers supplies to communicate with each for operational purposes. That is, the master power supply 1210 can communicate at least one operational parameter to the third power supply 1230. For example, in an embodiment of the present invention, the master power supply 1210 is communicating a phase angle setting to the trailing power supply 1230, which can be a user input setting to aid in stabilizing the welding arcs. For example, if the welding waveforms for the series and trailing arcs are balanced then the waveforms can be in-phase. However, if either or both of the waveforms are unbalanced, then the trailing arc waveform should be set out-of-phase with the series arc waveform. The waveforms can be out of phase by 1 to 359 degrees and should be set to provide a stable welding arc.

Further, as shown in FIG. 24, embodiments of the present invention can have either voltage or current sense leads (or both) 1317/1321 connected to the workpiece W. The use of voltage/current sense leads is generally known and need not be discussed in detail herein. Sense leads are typically used as feedback leads to allow the respective power supplies 1210/1230 monitor and control their operation. In the embodiment shown, the slave power supply 1220 does not have a sense lead connected to the workpiece W. In fact, the slave power supply 1220 has no direct connection with the workpiece W.

As described above, embodiments of this aspect of the invention provide stable modified series arc welding because the control over the current and the arc generated by the master and slave power supplies is more precise. Therefore, embodiments of the present invention can provide much better control and better quality over a wide range of workpiece thicknesses, without any adverse affects from excessive heat input. That is, embodiments of the present invention can weld workpieces having thicknesses in the range of ¼ to 1 inch thick (for example), and with the adjustment of the ground current setting the varying thicknesses can be easily accommodated. For example, when welding thinner materials the ground current (the current going into the workpiece) can be reduced, while the total current remains unchanged. In such a situation the overall heat input into the thinner material is reduced but a desired deposition rate is maintained. Therefore, the settings for the ground current and the total current can be based on at least the thickness of the workpiece to be welded and a user can set each of these settings taking into account the thickness. For thinner workpieces a user can input a total current which allows for fast welding speeds but a ground current which will prevent too much heat input into the workpiece, which is problematic with thinner workpieces. This is advantageous over known systems which require less current (and accordingly heat input) when welding thinner materials. Because of these advantages, high strength steels (such as those used in the shipbuilding industries) can be welded from a single side, having a high quality back bead structure and with much better control. This means that embodiments of the present invention can provide significant travel speed improvements over known methods. Embodiments of the present invention can achieve travel speeds in the range of 25 to 35 inches/min, even in the thinner and thicker workpieces, which traditionally require slower travel speeds. In another exemplary embodiment travel speeds can range between 15 and 40 inches/min. Of course, it is contemplated that higher and lower travel speeds may be achieved.

In further exemplary embodiments of the present invention, various welding waveform parameters can be adjusted to optimize weld performance based on the workpiece thickness, and other properties and based on the desired weld parameters. Specifically, wave balance, wave offset, frequency and phase angle of the welding waveforms can be optimized to achieve desired welding properties and performance. In exemplary embodiments of the present invention, and as previously discussed, a square wave profile can be utilized, as opposed to a sine wave profile. It is known that square wave profiles can provide increased efficiency because the current and voltage of the welding waveform spends more time at the peak values. The use of square wave profiles can provide increased arc stability, the ability to weld thicker pieces with a single welding pass, and the ability to weld thinner plates at faster speeds and reduced overall heat input.

Figure 25:
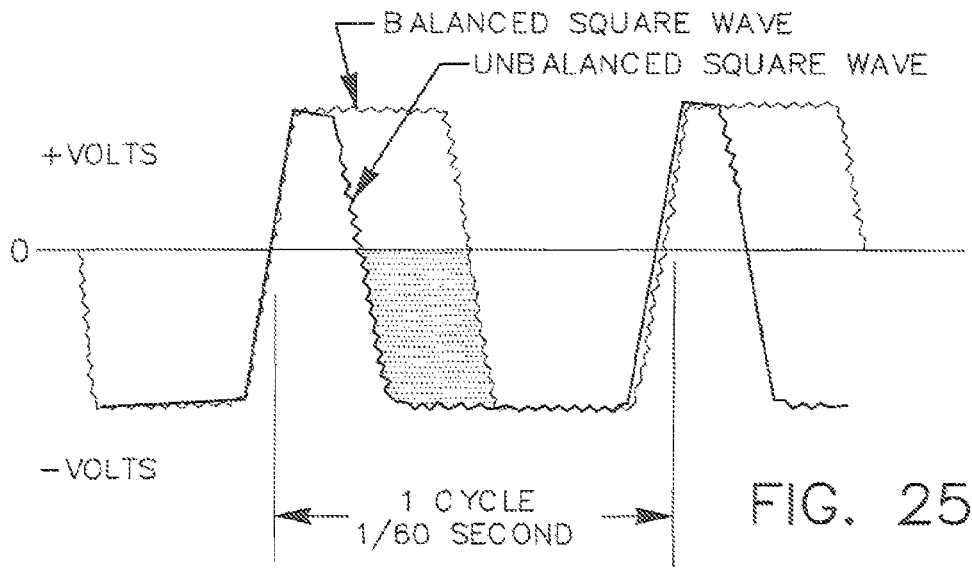
FIGS. 25 and 26 are graphs depicting wave balance.
Figure 26:
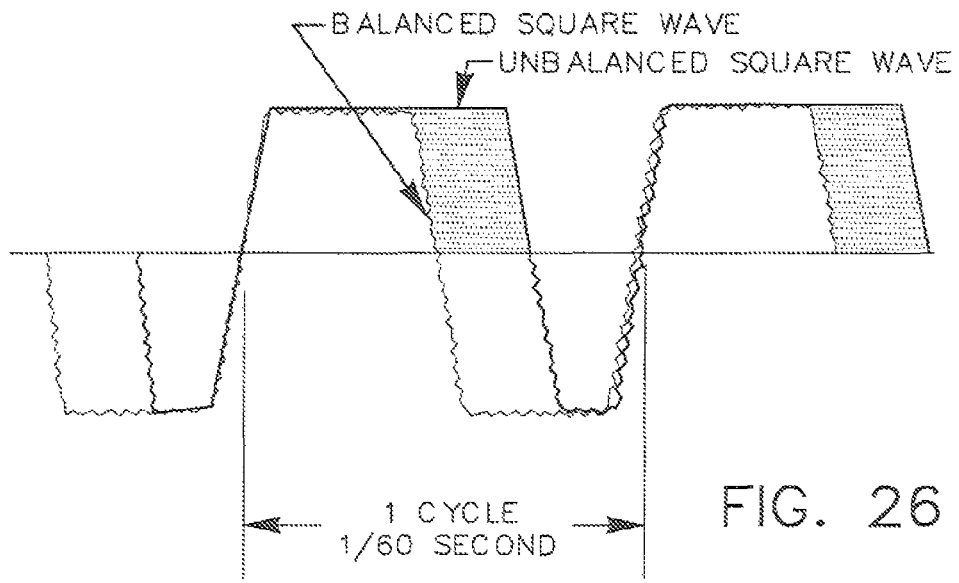

Wave balance refers to the DC+ component of a welding waveform. That is, a wave having a 25% balance is a wave having 25% of its cycle positive while the remaining 75% is negative. This is graphically represented in FIG. 25, in which both a negative balanced and balanced wave is shown. Similarly, FIG. 26 shows a positive unbalanced wave as compared to a balanced wave. In exemplary embodiments of the present invention, it is desirable to use a neutral or negatively balanced wave for the series electrode E1 and E2—that is a wave balance of 50% or less. The use of a negative balance increases the melt off of the welding electrodes (E1, E2 and E3). The wave balance of the welding waveforms can be tailored to achieve increased deposition while also decreasing penetration. In exemplary embodiments of the present invention, the trailing electrode E3 can have a wave balance that is positively balanced, that is greater than 50%.

Figure 27:
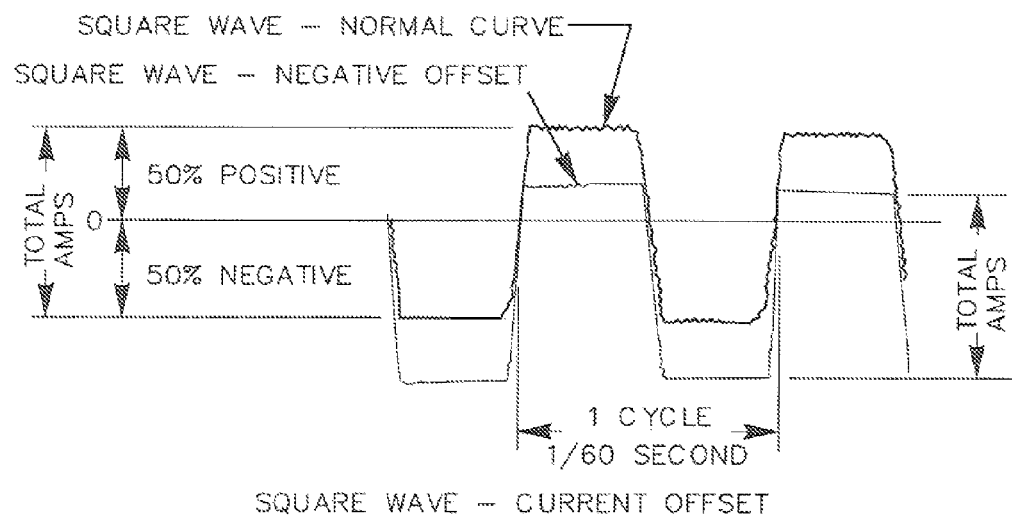
FIG. 27 is a graph depicting current offset.

Wave offset refers to a plus or minus shift of the current waveform with respect to the 0 current crossing. Thus, offset shifts the amplitude of the current to be either more positive or more negative, as opposed to balance which affects the amount of time that a current is either positive or negative. Offset can be used to control the amount of penetration into the workpiece W during welding. Furthermore, offset control can be utilized to improve arc stability when welding near the lower limit of the current range for a specific electrode diameter. FIG. 27 graphically depicts a square wave having no offset and a square wave having a negative offset. As can be seen, the negative offset waveform has been shifted such that the currents peaks have been shifted to be more negative (and less positive). Embodiments of the present invention can have offsets which are in the range of +/−25% of the peak amperage (positive or negative).

In exemplary embodiments of the present invention the waveform frequency can also be employed to provide optimal welding parameters. For example, by increasing the frequency of the waveforms the welding bead width is reduced and the convexity of the weld bead is increased. Further, by decreasing the waveform frequency more weld time is available at the peak current and voltage values, while less overall time is spent in the transition regions of the waveform. As such, welding can become more efficient. In exemplary embodiments of the present invention, the frequency of the welding waveforms can be between 20 and 100 Hz.

Figure 28:
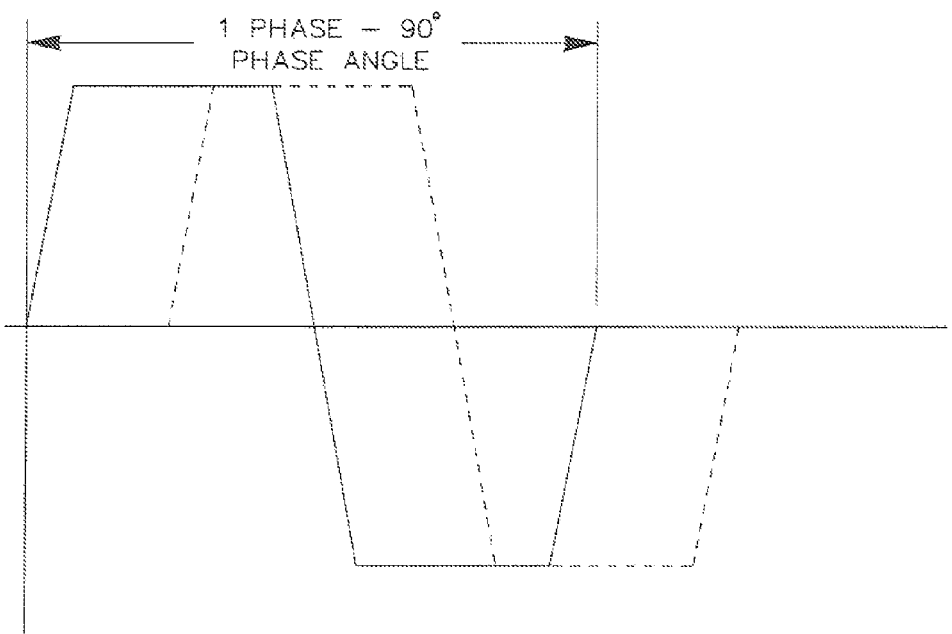
FIG. 28 is a graph depicting phase angle shift.

Phase angle is the angular separation of multiple AC current paths. FIG. 28 shows two current paths having a 90 degree phase angle difference. It is known that the electrical phase angle between two independent AC arcs, working in tandem, affects the stability of the arcs and the weld pool. Thus, phase angle can affect arc stability, bead shape, penetration and bead edge appearance. The phase angle can be set at any angle between 0 and 360 degrees, depending on the desired weld bead performance and characteristics.

In exemplary embodiments of the present invention where more penetration is desired, but reduced filler metal is needed (for example in butt weld type joints) the wave balance is greater than 50% and a positive offset can be utilized. In embodiments requiring more of a balance between penetration and filler metal deposition a balance of 50% or less can be utilized. In other embodiments requiring little penetration, but significant fill (for example, V-notch grooves) the balance should be less than 50%, using a high frequency—in the range of 20 to 100 Hz, and negative offset values. In some embodiments it may be possible to use frequencies below 20 Hz or higher than 100 Hz, but stability of the welding operation will need to be maintained.

In exemplary embodiments of the present invention, it may be beneficial to tune the welding waveform of the trailing electrode E3 to have more penetration than that of the series electrodes E1 and E2. This is because it may be desirable to have the trailing electrode E3 penetrate further into the bead made by electrodes E1 and E2 for bead shape properties.

While the invention has been particularly shown and described with reference to exemplary embodiments thereof, the invention is not limited to these embodiments. It will be understood by those of ordinary skill in the art that various changes in form and details may be made therein without departing from the spirit and scope of the invention as defined by the following claims.

What is claimed is:

1. A welding system, comprising:
a first welding power supply having a first positive output terminal and a first negative output terminal, wherein said first positive output terminal is coupled to a first contact tip and said first negative output terminal is coupled to a workpiece; and
a second welding power supply having a second positive output terminal and a second negative output terminal, wherein said second positive output terminal is coupled to said first contact tip and said second negative output terminal is coupled to a second contact tip;
wherein said second negative output terminal is not coupled to said workpiece,
wherein each of said first and second contact tips are oriented to direct a first welding electrode and a second welding electrode, respectively, to a common welding are for welding said workpiece, and
wherein said common welding arc is between said first welding electrode and said workpiece and between said first welding electrode and said second welding electrode.

2. The welding system of claim 1, further comprising at least a third power supply having a third positive output terminal and a third negative output terminal, wherein said third positive output terminal is coupled to a third contact tip and said third negative terminal is coupled to said workpiece.

3. The welding system of claim 1, wherein said first power supply supplies a first welding current having a first RMS value to said first welding electrode and said second power supply provides a second welding current to said first welding electrode, wherein said first RMS current is higher than said second RMS current.

4. The welding power supply of claim 3, wherein said first RMS current is higher than said second RMS current by 50 to 600 amps.

5. The welding power supply of claim 1, wherein said first and second power supplies provide a total RMS current to said common welding are and an RMS current provided by said first power supply is greater than 50% of said total RMS current.

6. The welding power supply of claim 1, wherein at least one of said first and second power supplies is coupled to a user interface to receive a user input of at least a total current and a ground current.

7. The welding power supply of claim 1, further comprising a welding carriage assembly including each of said first and second contact tips and securing each of said first and second contact tips in a fixed position for welding such that said first and second electrodes intersect.

8. The welding power supply of claim 7, wherein said welding carriage assembly further comprises a third contact tip coupled to a third power supply, wherein said third contact tip is oriented to direct a third welding electrode to said workpiece during welding and wherein said third contact tip is positioned behind, in a travel direction, of said second contact tip such that a distance between said second welding electrode and said third welding electrode is in the range of 3 to 6 inches.

9. The welding system of claim 1, further comprising a first wire feeder for providing said first welding electrode and a second wire feeder for providing said second welding electrode, wherein said first power supply controls both of said first and second wire feeders.

10. The welding system of claim 2, wherein said first power supply is coupled to said third power supply to control an operational parameter of said third power supply.

11. The welding system of claim 3, wherein a magnitude of at least one of said first and second RMS currents and a sum of said first and second RMS currents is based on at least a thickness of said workpiece.

12. A method of welding, comprising:
coupling a first positive output of a first power supply to a first contact tip and a first negative output of said first power supply to a workpiece to be welded;
coupling a second positive output of a second power supply to said first contact tip and a second negative output of said second power supply to a second contact tip such that said second negative output is not coupled to said workpiece during welding;
directing a first welding electrode to said workpiece through said first contact tip;
directing a second welding electrode to said workpiece through said second contact tip such that said first and second welding electrodes share a common welding are between said first welding electrode and said workpiece and between said first welding electrode and said second welding electrode;
providing a first RMS current from said first power supply to said first welding electrode; and
providing a second RMS current from said second power supply to said first welding electrode.

13. The method of claim 12, wherein said first RMS current is larger than said second RMS current.

14. The method of claim 12, wherein said first RMS current is larger than said second RMS current by 50 to 600 amps.

15. The method of claim 12, further comprising entering via a user interface a total current setting and a ground current setting, wherein said total current setting determines a sum of said first and second RMS currents, and the second RMS current is a difference between the total current setting and the ground current setting.

16. The method of claim 12, further comprising directing a third welding electrode to said workpiece, wherein said third welding electrode is coupled to a third power supply and wherein said third welding electrode is positioned 3 to 6 inches behind said second welding electrode, in a travel direction, during welding.

17. The method of claim 12, wherein a travel speed of said welding is in the range of 15 to 40 inches per minute.

18. The method of claim 12, wherein a wire feed speed of said first welding electrode is the same as a wire feed speed of said second welding electrode.

19. The method of claim 12, wherein said first power supply communicates to said second power supply an operational set point for said second RMS current.

20. The method of claim 12, wherein said first welding electrode has a different diameter than said second welding electrode.

21. The method of claim 12, further comprising determining a magnitude of at least one of said first and second RMS currents and a total current setting, which is a sum of said first and second RMS currents based on at least a thickness of said workpiece.

* * * * *